US009230361B2

(12) United States Patent
Ishibashi

(10) Patent No.: US 9,230,361 B2
(45) Date of Patent: Jan. 5, 2016

(54) ANTIALIASING IMAGE GENERATION APPARATUS FOR SELECTING AN ANTIALIASING TECHNIQUE TO BE APPLIED TO A PIXEL USING PIXEL DATA

(75) Inventor: Yudai Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 238 days.

(21) Appl. No.: 13/809,466

(22) PCT Filed: May 18, 2012

(86) PCT No.: PCT/JP2012/003267
§ 371 (c)(1),
(2), (4) Date: Jan. 10, 2013

(87) PCT Pub. No.: WO2013/005366
PCT Pub. Date: Jan. 10, 2013

(65) Prior Publication Data
US 2013/0113794 A1 May 9, 2013

(30) Foreign Application Priority Data
Jul. 5, 2011 (JP) ................. 2011-149501

(51) Int. Cl.
G06T 15/00 (2011.01)
G06T 15/50 (2011.01)
(Continued)

(52) U.S. Cl.
CPC ............. *G06T 15/503* (2013.01); *G06T 15/405* (2013.01); *G06T 2200/12* (2013.01); *G09G 5/363* (2013.01)

(58) Field of Classification Search
USPC ........................................ 345/422
See application file for complete search history.

(56) References Cited

U.S. PATENT DOCUMENTS 6,967,663 B1 * 11/2005 Bastos et al. .................. 345/613
8,345,063 B2    1/2013 Iourcha et al.
(Continued)

FOREIGN PATENT DOCUMENTS

CN    101383045    3/2009
CN    101583975    11/2009
(Continued)

OTHER PUBLICATIONS

International Search Report issued Aug. 21, 2012 in corresponding International Application No. PCT/JP2012/003267.
(Continued)

*Primary Examiner* — Barry Drennan
*Assistant Examiner* — Terrell Robinson
(74) *Attorney, Agent, or Firm* — Wenderoth, Lind & Ponack, L.L.P.

(57) ABSTRACT

An antialiasing image generation apparatus includes a distribution information acquisition unit configured to acquire distribution information that indicates the distribution of a plurality of Z values, a polygon data expansion unit configured to expand polygon data into display coordinates, a representative point pixel data generation unit configured to generate pixel data including a Z value at a representative point, an antialiasing technique selection unit configured to select an antialiasing technique using the Z value included in the pixel data and the distribution information, and an antialiasing processing unit configured to generate a graphics image by performing antialiasing processing on the pixel according to the selected antialiasing technique.

12 Claims, 16 Drawing Sheets

(51) Int. Cl.
*G06T 15/40* (2011.01)
*G09G 5/36* (2006.01)

(56) References Cited

U.S. PATENT DOCUMENTS

| | | | |
|---|---|---|---|
| 8,605,086 | B2 | 12/2013 | Everitt et al. |
| 8,605,087 | B2 | 12/2013 | Everitt et al. |
| 9,019,299 | B2 | 4/2015 | Iourcha et al. |
| 2006/0047453 | A1* | 3/2006 | Reeve et al. ............ 702/81 |
| 2009/0256848 | A1 | 10/2009 | Iourcha et al. |
| 2010/0001999 | A1* | 1/2010 | Everitt et al. ............ 345/426 |
| 2010/0002000 | A1 | 1/2010 | Everitt et al. |
| 2010/0020096 | A1* | 1/2010 | Tomaru et al. ............ 345/611 |
| 2010/0110102 | A1 | 5/2010 | Nystad et al. |
| 2013/0106902 | A1 | 5/2013 | Iourcha et al. |

FOREIGN PATENT DOCUMENTS

| | | |
|---|---|---|
| CN | 101620725 | 1/2010 |
| CN | 101916453 | 12/2010 |
| CN | 102016916 | 4/2011 |
| JP | 2008-234087 | 10/2008 |
| WO | 2008/084543 | 7/2008 |
| WO | 2009/124248 | 10/2009 |

OTHER PUBLICATIONS

Office Action with Search Report issued Aug. 11, 2015 in corresponding Chinese Application No. 201280002318.2, with partial English translation.

* cited by examiner

ANTIALIASING IMAGE GENERATION APPARATUS FOR SELECTING AN ANTIALIASING TECHNIQUE TO BE APPLIED TO A PIXEL USING PIXEL DATA

TECHNICAL FIELD

The present invention relates to an antialiasing image generation apparatus that performs antialiasing processing and generates a graphics image on which the antialiasing processing has been performed, the antialiasing processing being performed for smoothly displaying polygons when a three-dimensional image constituted by the polygons is rendered in a two-dimensional plane.

BACKGROUND ART

There have conventionally been antialiasing image generation apparatuses that perform antialiasing processing and generate a graphics image on which the antialiasing processing has been performed, the antialiasing processing being performed for smoothly displaying polygons when a three-dimensional image constituted by the polygons is rendered in a two-dimensional plane. The technique disclosed in PTL 1 relates to such an antialiasing image generation apparatus.

CITATION LIST

Patent Literature

[PTL 1] WO/2008/084543

SUMMARY OF INVENTION

Technical Problem

However, the antialiasing processing could possibly increase the processing load. The antialiasing processing could also possibly degrade the image quality.

Thus, it is an object of the present invention to provide an antialiasing image generation apparatus that executes antialiasing processing while appropriately adjusting the balance between suppression of an increase in the processing load and suppression of degradation in the image quality.

Solution to Problem

In order to achieve the above object, an antialiasing image generation apparatus according to an aspect of the present invention is an antialiasing image generation apparatus for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane. The antialiasing image generation apparatus includes a distribution information acquisition unit configured to acquire distribution information that indicates a distribution of a plurality of Z values in the three-dimensional image, a polygon data expansion unit configured to read polygon data indicating the polygon from a memory and expand the read polygon data into display coordinates, a representative point pixel data generation unit configured to, for each of pixels in a region where the polygon has been rendered, generate pixel data that includes a Z value at a representative point of the pixel from the polygon data expanded by the polygon data expansion unit, an antialiasing technique selection unit configured to, for each of the pixels, select an antialiasing technique applied to the pixel from among a plurality of antialiasing techniques, using the Z value included in the pixel data generated corresponding to the pixel by the representative point pixel data generation unit and the distribution information acquired by the distribution information acquisition unit, and an antialiasing processing unit configured to generate the graphics image by, for each of the pixels, performing the antialiasing processing on the pixel according to the antialiasing technique selected corresponding to the pixel by the antialiasing technique selection unit.

Note that such a general and specific embodiment may be implemented by a system, a method, an integrated circuit, a computer program, or a non-transitory recording medium such as a computer-readable CD-ROM or may be implemented by any combination of a system, a method, an integrated circuit, a computer program, and a recording medium.

Advantageous Effects of Invention

According to the present invention, it is possible to execute antialiasing processing while appropriately adjusting the balance between suppression of an increase in the processing load and suppression of degradation in the image quality.

DESCRIPTION OF EMBODIMENTS

Knowledge as the Basis for the Invention

The inventors of the present invention have found that the following problems could possibly arise with the antialiasing image generation apparatuses described in the "Background Art".

First, processing for generating a computer graphics (CG) image on which antialiasing processing has been performed will be described. The processing for generating a computer graphics image places a large computation load on the apparatuses. For this reason, an information processing apparatus that performs image generation processing in real time is provided with a dedicated image generation apparatus (graphics processing unit) for performing image generation processing, separately from a central processing unit (CPU).

Figure 1:
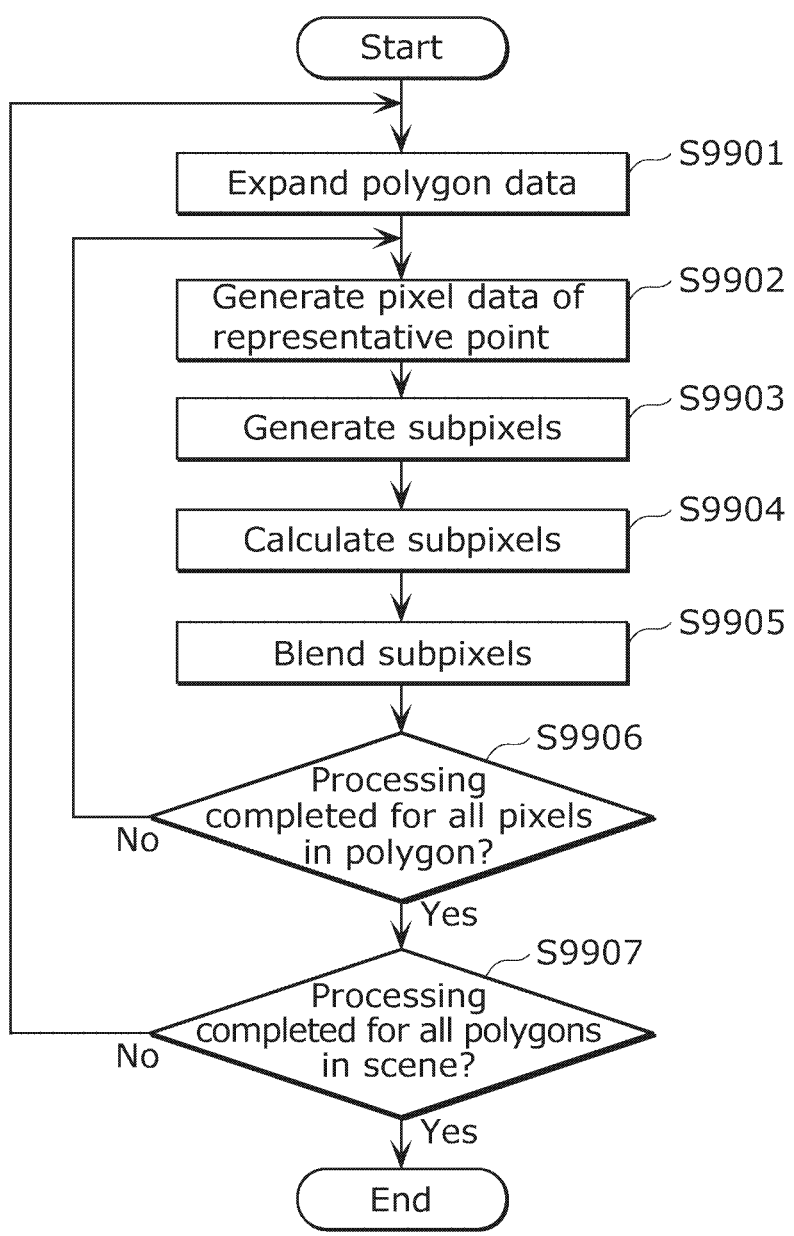
FIG. 1 is a flowchart showing processing of a general antialiasing image generation method.

FIG. 1 is a flowchart showing processing of an antialiasing image generation method executed by a general antialiasing image generation apparatus.

A general antialiasing image generation apparatus first reads polygon data that constitutes a scene from an information storage device (memory) and expands the read polygon data into display coordinates (S9901). The antialiasing image generation apparatus then generates pixel data of a representative point of each pixel in a region where the polygon has been rendered (polygon rendering region) (S9902). Note that pixel data is constituted by X and Y coordinates that indicate the position of a pixel, a color value of the pixel, a Z value that represents the depth, and the like. The Z value is also referred to as a "depth value". Typically, a smaller Z value indicates a more forward position, and a larger Z value indicates a more backward position.

Next, the antialiasing image generation apparatus determines whether a plurality of sample points of each pixel in the polygon rendering region are each inside or outside the polygon, based on the antialiasing technique. The antialiasing image generation apparatus then generates subpixels that correspond to those of the sample points that are inside the polygon (S9903). Then, the antialiasing image generation apparatus calculates color values, Z values, and the like of the generated subpixels, thereby generating calculated pixel data (S9904).

The calculated pixel data of the subpixels is blended and merged into pixel data of the pixel. The color value of the merged pixel data is stored in a frame buffer, and the Z value is stored in a Z buffer (S9905). Note that the frame buffer represents a memory or an area in a memory for temporarily storing color values in order to display final image data. Similarly, the Z buffer represents a memory or an area in a memory for temporarily storing Z values in order to display final image data.

The antialiasing image generation apparatus determines whether or not the processing (from S9902 to S9905) has been completed for all the pixels in the polygon (S9906). If the processing has not been completed for all the pixels in the polygon (No in S9906), the processing (from S9902 to S9905) is repeated. If the processing has been completed for all the pixels in the polygon (Yes in S9906), it is determined whether or not processing (from S9901 to S9906) has been completed for all the polygons in the scene (S9907).

If the processing has not been completed for all the polygons in the scene (No in S9907), the processing (from S9901 to S9906) is repeated. If the processing has been completed for all the polygons in the scene (Yes in S9907), the processing for rendering that scene ends.

Figure 2:
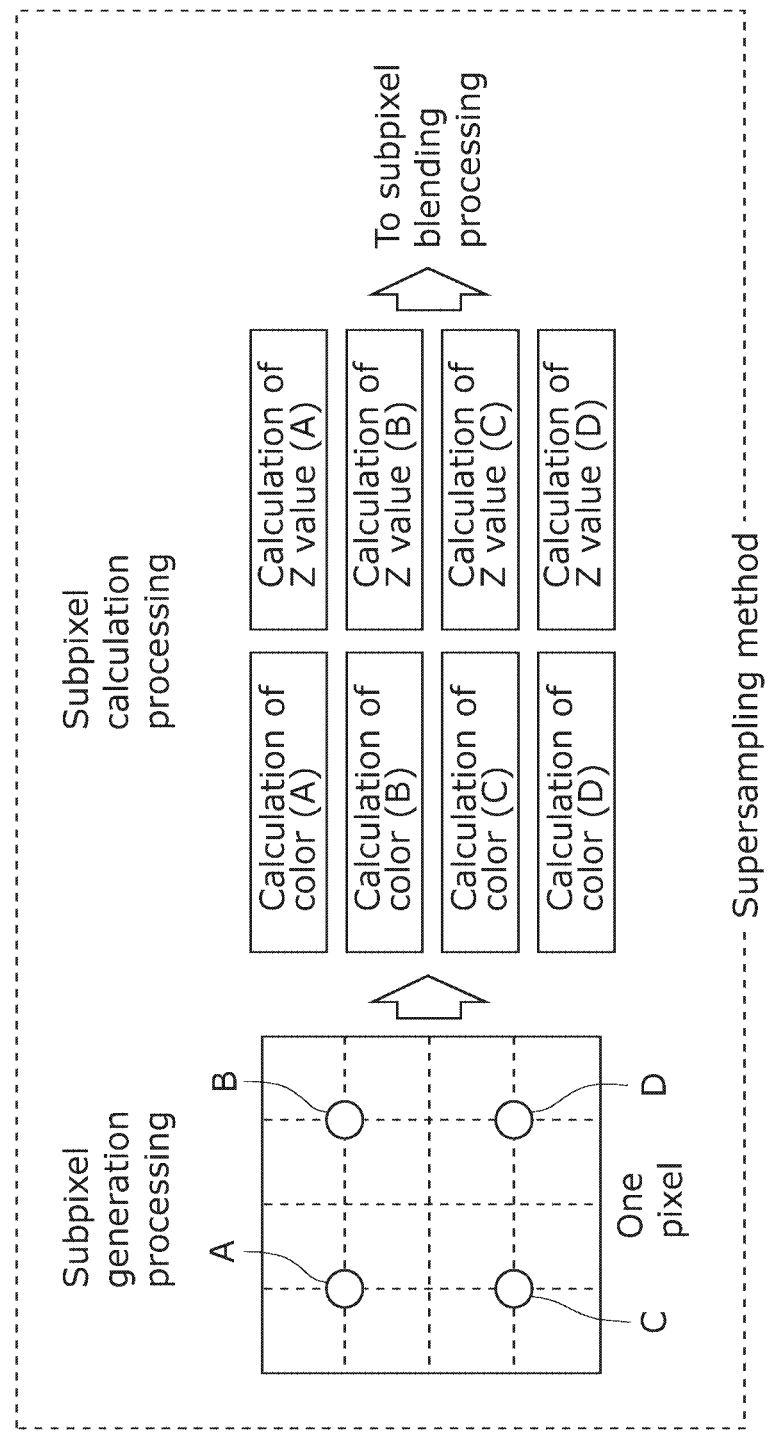
FIG. 2 illustrates a supersampling method.
Figure 3:
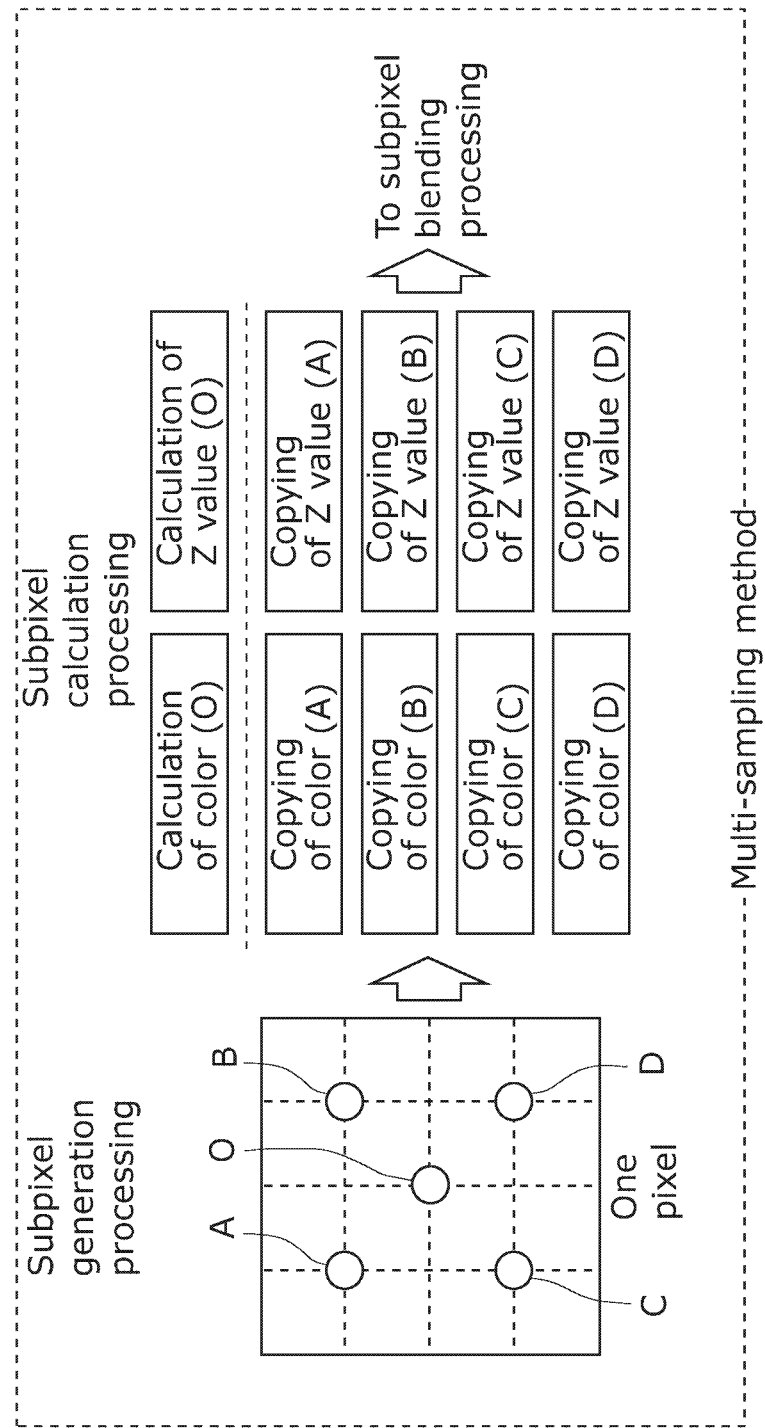
FIG. 3 illustrates a multi-sampling method.

FIGS. 2 and 3 illustrate examples of the subpixel generation processing (S9903) and the subpixel calculation processing (S9904) in FIG. 1.

FIG. 2 illustrates the subpixel generation processing (supersampling subpixel generation processing) and the subpixel calculation processing (supersampling subpixel calculation processing) when employing a supersampling method as an antialiasing technique.

According to the supersampling method, the antialiasing image generation apparatus generates pixel data of each subpixel for all sample points A to D in a single pixel. Then, the antialiasing image generation apparatus calculates the color value and the Z value for each subpixel.

More specifically, the antialiasing image generation apparatus calculates the color value and the Z value at the sample point A from the polygon data. The polygon data includes a plurality of color values and a plurality of Z values at a plurality of vertices that constitute a polygon. That is, the antialiasing image generation apparatus calculates the color value and the Z value at the sample point A from a plurality of color values and a plurality of Z values. At this time, the antialiasing image generation apparatus calculates the color value and the Z value at the sample point A in accordance with a plurality of distances from the sample point A to a plurality of vertices.

In a similar manner, the antialiasing image generation apparatus calculates the color value and the Z value at each of the sample points B to C. Ultimately, the antialiasing image generation apparatus merges the plurality of color values and the plurality of Z values that correspond to the sample points A to D, thus generating pixel data that corresponds to a single pixel. At this time, the antialiasing image generation apparatus averages the plurality of color values and the plurality of Z values. Through this, antialiasing processing is performed.

Because the color values and the Z values of all subpixels are calculated, the supersampling method is characterized by a large number of calculations but high image quality.

FIG. 3 illustrates the subpixel generation processing (multi-sampling subpixel generation processing) and the subpixel calculation processing (multi-sampling subpixel calculation processing) when employing a multi-sampling method as an antialiasing technique.

According to the multi-sampling method, the antialiasing image generation apparatus generates pixel data of a representative point O in a single pixel. The antialiasing image generation apparatus then calculates the color value and the Z value from the pixel data of the representative point O. Then, the antialiasing image generation apparatus regards the calculated color value and the calculated Z value of the representative point O as calculated pixel data of the sample points A to D.

At this time, the antialiasing image generation apparatus copies the calculated color value and the calculated Z value of the representative point O into only those of the sample points A to D that are within the polygon rendering region. Then, as with the supersampling method, the plurality of color values and the plurality of Z values that correspond to the sample points A to D are merged into pixel data that corresponds to a single pixel. Accordingly, the ratio at which the color value and the Z value are reflected varies depending on the ratio of sample points included in the polygon. Through this, simplified antialiasing processing is performed.

Because the color value and the Z value are calculated at only the representative point, the multi-sampling method is characterized by a small number of calculations but low image quality.

In the case where the image quality is improved using the supersampling method, a general antialiasing image generation apparatus has a problem in that the number of calculations of color values and Z values increases. In particular, in recent years, it is becoming common to execute the calculation of color values with a pixel shader, and thus, an increase in the number of calculations is a significant problem. Here, the pixel shader refers to a user program for executing processing on pixels or subpixels in a graphics processing unit.

In view of the above problem, PTL 1 discloses a technique for applying a fine antialiasing technique to forward regions in three-dimensional space that are rendered in a two-dimensional plane, and a rough antialiasing technique to backward regions. This suppresses degradation in the image quality in conspicuous regions and suppresses an increase in the processing load in inconspicuous regions.

However, with the above technique disclosed in PTL 1, there is a possibility that the result of selection of the antialiasing technique will lean to one side, either the fine antialiasing technique or the rough antialiasing technique.

For example, with the technique disclosed in PTL 1, the supersampling method illustrated in FIG. 2 is employed for pixel data of pixels that are located close to the point of view (Z value<threshold value). The multi-sampling method illustrated in FIG. 3 is employed for pixel data of pixels that are located distant from the point of view (Z value≥threshold value). That is, antialiasing processing according to the supersampling method is executed on pixel data that has a Z value smaller than the threshold value. Then, antialiasing processing according to the multi-sampling method is executed on pixel data that has a Z value greater than or equal to the threshold value.

Figure 4:
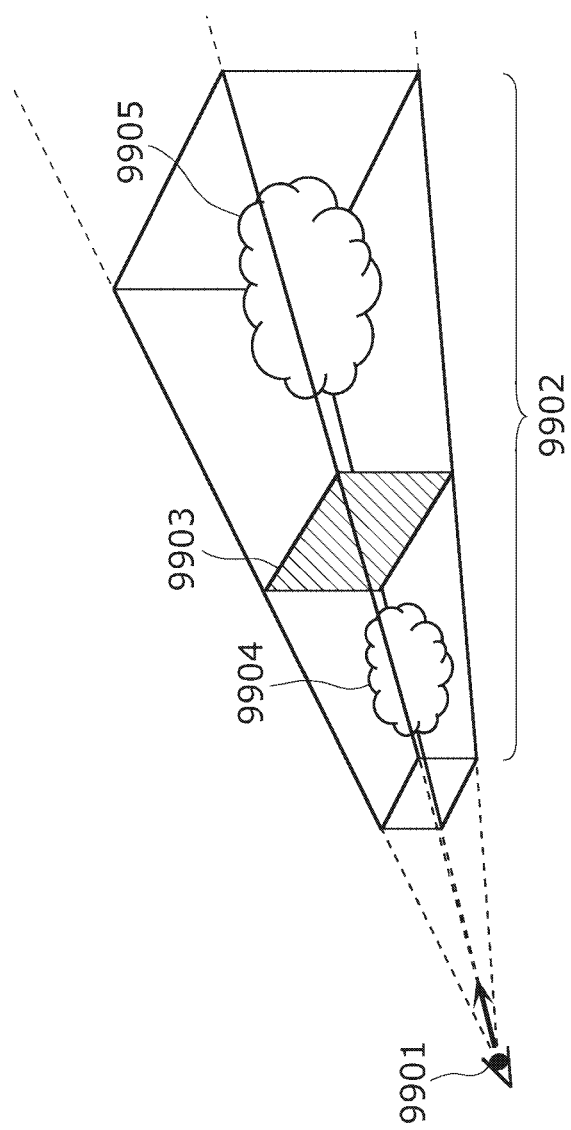
FIG. 4 illustrates a problem that arises when using a threshold value.

FIG. 4 illustrates a problem that arises in the case of using a threshold value as described above. In FIG. 4, processing for rendering polygons is executed in a space 9902 that is visible from a point of view 9901. A threshold value for determining whether it is forward or backward is indicated by a plane 9903.

Here, if a large number of polygons are concentrated in a space 9904 in front of the plane 9903, antialiasing techniques to be selected lean to one side, namely, the supersampling method. As a result, the number of calculations is exploded. On the other hand, if a large number of polygons are concentrated in a space 9905 in the rear of the plane 9903, antialiasing techniques to be selected lean to the other side, namely, the multi-sampling method. As a result, the image quality is degraded.

In other words, there are cases where the balance between suppression of an increase in the processing load and suppression of degradation in the image quality cannot appropriately be adjusted in the antialiasing processing.

In view of this, an antialiasing image generation apparatus according to an aspect of the present invention is an antialiasing image generation apparatus for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane. The antialiasing image generation apparatus includes a distribution information acquisition unit configured to acquire distribution information that indicates a distribution of a plurality of Z values in the three-dimensional image, a polygon data expansion unit configured to read polygon data indicating the polygon from a memory and expand the read polygon data into display coordinates, a representative point pixel data generation unit configured to, for each of pixels in a region where the polygon has been rendered, generate pixel data that includes a Z value at a representative point of the pixel from the polygon data expanded by the polygon data expansion unit, an antialiasing technique selection unit configured to, for each of the pixels, select an antialiasing technique applied to the pixel from among a plurality of antialiasing techniques, using the Z value included in the pixel data generated corresponding to the pixel by the representative point pixel data generation unit and the distribution information acquired by the distribution information acquisition unit, and an antialiasing processing unit configured to generate the graphics image by, for each of the pixels, performing the antialiasing processing on the pixel according to the antialiasing technique selected corresponding to the pixel by the antialiasing technique selection unit.

Through this, the antialiasing image generation apparatus can adaptively select an antialiasing technique applied to a pixel to be processed in accordance with the relative relation between the distribution of a plurality of Z values and the Z value of the pixel to be processed. Accordingly, the antialiasing image generation apparatus can execute the antialiasing processing while appropriately adjusting the balance between suppression of an increase in the processing load and suppression of degradation in the image quality.

For example, the antialiasing technique selection unit may be configured to select the antialiasing technique from the plurality of antialiasing techniques that each require a different number of calculations per pixel.

Accordingly, the antialiasing image generation apparatus can appropriately select an antialiasing technique applied to a pixel to be processed from among various antialiasing techniques that each require a different number of calculations per pixel.

For example, the distribution information acquisition unit may be configured to acquire the distribution information from a Z buffer in which the Z values in the three-dimensional image that serves as a current rendering target are stored.

This enables the antialiasing image generation apparatus to select an antialiasing technique based on the distribution of a plurality of Z values in a three-dimensional image that serves as a current rendering target. Accordingly, the antialiasing image generation apparatus can more appropriately select an antialiasing technique.

For example, the distribution information acquisition unit may be configured to acquire the distribution information from a Z buffer in which the Z values in the three-dimensional image that serves as a past rendering target are stored.

This enables the antialiasing image generation apparatus to select an antialiasing technique based on the distribution of a plurality of Z values in a three-dimensional image of a past rendering target. Accordingly, the antialiasing image generation apparatus can select an antialiasing technique without causing a delay in processing.

For example, the distribution information acquisition unit may be configured to acquire an average value of the Z values or a median value of the Z values as the distribution information.

Accordingly, the antialiasing image generation apparatus can appropriately select an antialiasing technique based on the average value of a plurality of Z values or the like.

For example, the antialiasing technique selection unit may be configured to determine a threshold value using the distribution information acquired by the distribution information acquisition unit, and when the Z value included in the pixel data is the same as the threshold value or indicates a more forward position than the threshold value, select a first antialiasing technique, and when the Z value included in the pixel data indicates a more backward position than the threshold value, select a second antialiasing technique that requires a smaller number of calculations per pixel than the first antialiasing technique.

This enables the antialiasing image generation apparatus to appropriately set the threshold value for selecting an antialiasing technique based on the distribution of a plurality of Z values. Accordingly, the antialiasing image generation apparatus can appropriately select an antialiasing technique.

For example, the antialiasing image generation apparatus may further include a reference deviation value determination unit configured to determine a reference deviation value that serves as a reference for selecting the antialiasing technique from among the plurality of antialiasing techniques. The distribution information acquisition unit may be configured to acquire an average value and a standard deviation of the Z values as the distribution information, and for each of the pixels, the antialiasing technique selection unit may be configured to calculate a deviation value of the Z value included in the pixel data generated corresponding to the pixel by the representative point pixel data generation unit, using the average value and the standard deviation acquired by the distribution information acquisition unit, and select the antialiasing technique applied to the pixel, using the deviation value calculated corresponding to the pixel and the reference deviation value determined by the reference deviation value determination unit.

This enables the antialiasing image generation apparatus to select an antialiasing technique in accordance with the deviation value. The deviation value is based on the distribution of a plurality of Z values. Accordingly, the antialiasing image generation apparatus can appropriately select an antialiasing technique from among a plurality of antialiasing techniques without the selection being leaning to one side, i.e., a specific antialiasing technique.

For example, the reference deviation value determination unit may be configured to determine the reference deviation value by determining a ratio at which each of the antialiasing techniques is selected, from an assumed number of processing steps and the number of processing steps executed and comparing the determined ratio with a cumulative percentage of a normal distribution curve, the assumed number of processing steps being the number of processing steps assumed to be executed per pixel as an objective, and the number of processing steps executed being the number of processing steps executed per pixel according to each of the antialiasing techniques.

This enables the antialiasing image generation apparatus to select an antialiasing technique such that the number of processing steps executed approaches the assumed number of processing steps. Accordingly, the antialiasing image generation apparatus can appropriately select an antialiasing technique depending on its capability.

For example, the antialiasing image generation apparatus may further include a number-of-steps measurement unit configured to measure the number of processing steps executed. The reference deviation value determination unit may be configured to determine the reference deviation value by determining the ratio from the assumed number of processing steps and the number of processing steps executed that is measured by the number-of-steps measurement unit when the three-dimensional image that serves as a past rendering target is rendered.

This enables the antialiasing image generation apparatus to determine an appropriate ratio of a plurality of antialiasing techniques based on the measurement result of the past number of processing steps executed. Accordingly, the antialiasing image generation apparatus can appropriately select an antialiasing technique without causing a delay in processing.

For example, when the calculated deviation value is the same as the reference deviation value or indicates a more forward position than the reference deviation value, the antialiasing technique selection unit may be configured to select a first antialiasing technique, and when the calculated deviation value indicates a more backward position than the reference deviation value, the antialiasing technique selection unit may be configured to select a second antialiasing technique that requires a smaller number of calculations per pixel than the first antialiasing technique.

Accordingly, the antialiasing image generation apparatus can appropriately select an antialiasing technique based on the comparison between the reference deviation value and the deviation value of a pixel to be processed.

For example, the antialiasing technique selection unit may be configured to select a supersampling method as the first antialiasing technique and may be configured to select a multi-sampling method as the second antialiasing technique.

As a result, the supersampling method is applied to forward pixels and the multi-sampling method is applied to backward pixels. This suppresses degradation in the image quality in conspicuous regions and suppresses an increase in the processing load in inconspicuous regions.

Furthermore, these overall or specific embodiments may be implemented by a system, a method, an integrated circuit, a computer program, or a non-transitory recording medium such as a computer-readable CD-ROM or may be implemented by any combination of a system, a method, an integrated circuit, a computer program, or a recording medium.

Hereinafter, embodiments of the present invention will be described in detail with reference to the drawings. Note that the embodiments described below are all preferable specific examples of the present invention. Numerical values, shapes, materials, constituent elements, positions where the constituent elements are disposed, forms of connection of the constituent elements, steps, a sequence of steps, and the like are merely examples and do not intend to limit the present invention. Among the constituent elements described in the following embodiments, those that are not described in the independent claims, which represent the most significant concepts of the invention, are described as arbitrary constituent elements.

In the following description, a smaller Z value indicates a more forward position and a larger Z value indicates a more backward position. The essence is, however, unchanged even if a smaller Z value indicates a more backward position and a larger Z value indicates a more forward position.

Embodiment 1

Figure 5:
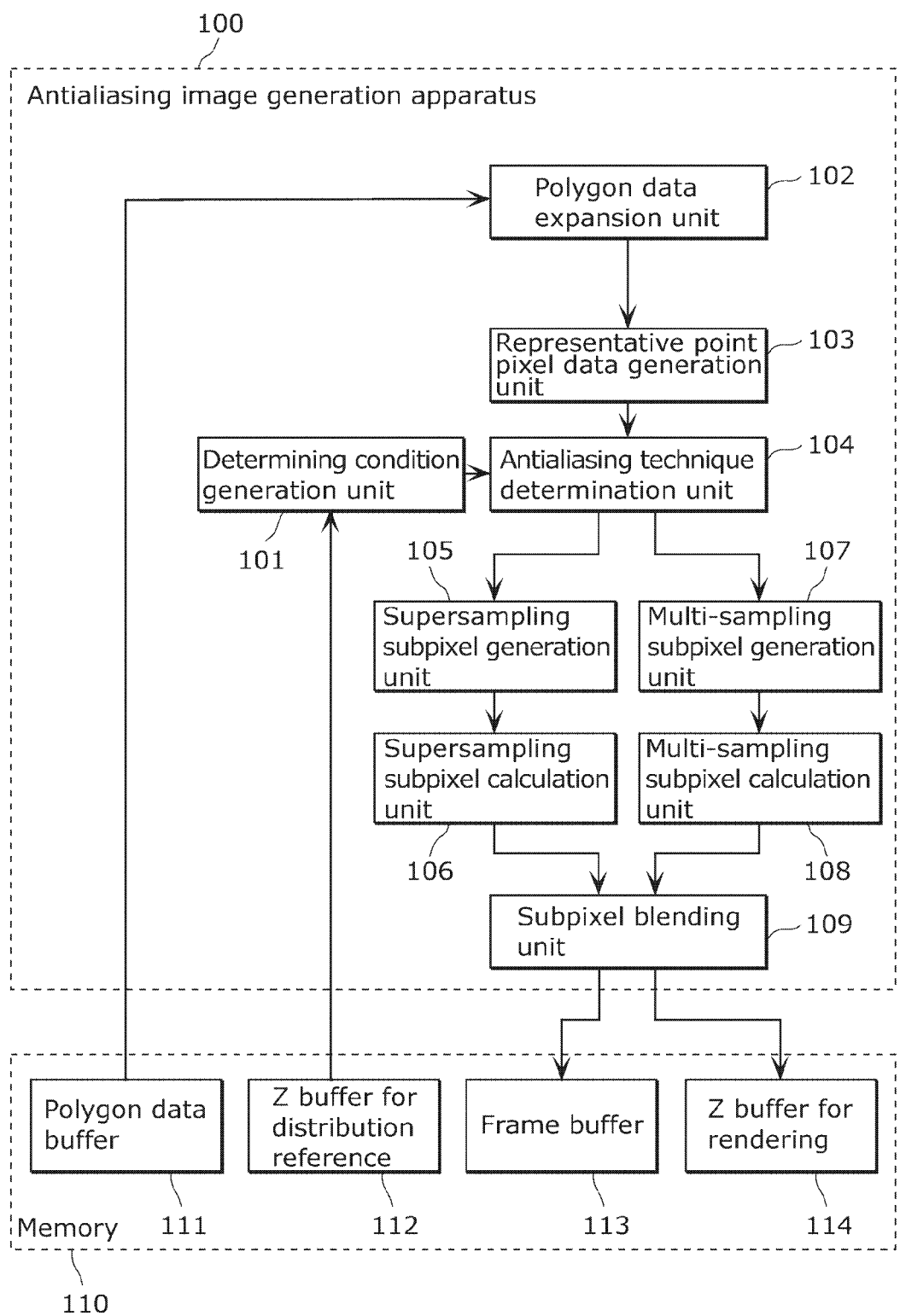
FIG. 5 is a block diagram showing an example of the configuration of an antialiasing image generation apparatus according to Embodiment 1.

FIG. 5 is a block diagram showing an example of the configuration of an antialiasing image generation apparatus according to this embodiment. An antialiasing image generation apparatus 100 in FIG. 5 includes a determining condition generation unit 101, a polygon data expansion unit 102, a representative point pixel data generation unit 103, an antialiasing technique determination unit 104, a supersampling subpixel generation unit 105, a supersampling subpixel calculation unit 106, a multi-sampling subpixel generation unit 107, a multi-sampling subpixel calculation unit 108, and a subpixel blending unit 109.

The antialiasing image generation apparatus 100 generates a graphics image by accessing a polygon data buffer 111, a Z buffer 112 for distribution reference, a frame buffer 113, and a Z buffer 114 for rendering. These buffers are each an area in a memory 110. In particular, an area for storing Z values is referred to as a "Z buffer".

Figure 6:
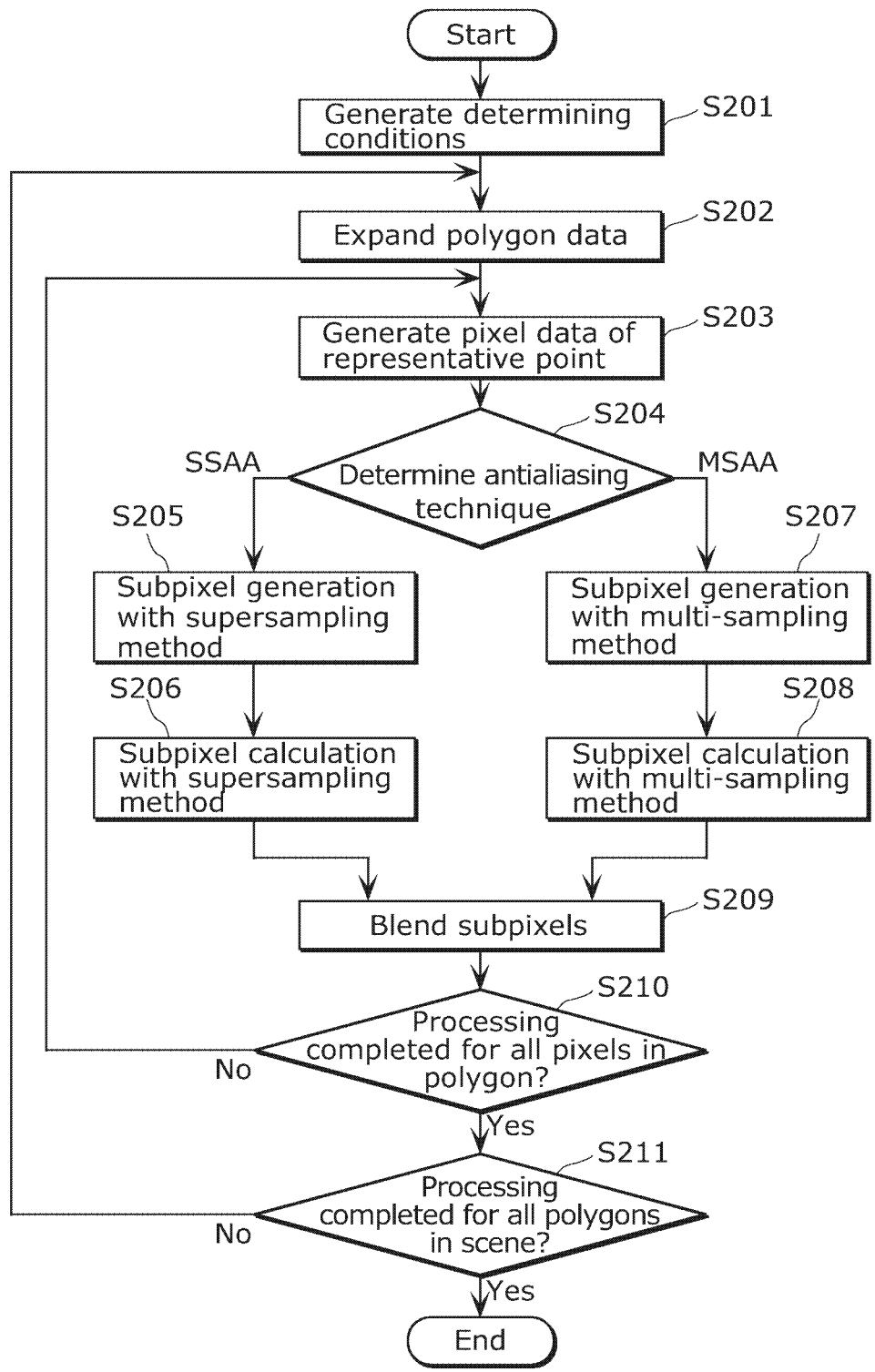
FIG. 6 is a flowchart showing an example of operations performed by the antialiasing image generation apparatus according to Embodiment 1.

FIG. 6 is a flowchart showing an example of operations performed by the antialiasing image generation apparatus 100 shown in FIG. 5.

First, the determining condition generation unit 101 reads a plurality of Z values that are constituted by Z values corresponding to pixels from the Z buffer 112 for distribution reference in the memory 110. The determining condition generation unit 101 then generates determining conditions used by the antialiasing technique determination unit 104 (S201).

Here, a plurality of Z values in a scene to be processed (processing target scene) may have been stored in the Z buffer 112 for distribution reference in pre-processing. For example, the polygon data expansion unit 102 may read polygon data of a processing target scene from the polygon data buffer 111 and expand the read polygon data in advance. Then, the representative point pixel data generation unit 103 may calculate Z values corresponding pixels and store the calculated Z values in the Z buffer 112 for distribution reference.

Alternatively, the Z buffer 114 for rendering in which a plurality of Z values in a scene previous to a processing target scene are stored may be used as the Z buffer 112 for distribution reference. Using the Z buffer 114 for rendering in which a plurality of Z values in the previous scene are stored eliminates the need to perform pre-processing for calculating a plurality of Z values in a processing target scene. This considerably reduces a delay in processing.

Note that a scene as used herein refers to a virtual scene having a depth. A graphics image is generated by rendering a scene in a two-dimensional plane. That is, a scene can also be expressed as a three-dimensional image in three-dimensional space. The antialiasing image generation apparatus 100 can also generate a plurality of graphics images that are continuous in time, i.e., graphics video, from a plurality of scenes that are continuous in time. As described above, the determining condition generation unit 101 may reference a plurality of Z values that have been calculated for a scene previous to the processing target scene.

Specific examples of the determining conditions generated by the determining condition generation unit 101 include an average value of Z values, a standard deviation of Z values, and the like. A formula 1 is a calculation formula of Zave that is an average value of a plurality of Z values in a scene, and a formula 2 is a calculation formula of Zdev that is a standard deviation of a plurality of Z values in a scene.

$$Zave = \sum_{i=1}^{n} Zi/n \qquad \text{(Formula 1)}$$

$$Zdev = \sqrt{\sum_{i=1}^{n} (Zi - Zave)^2/n} \qquad \text{(Formula 2)}$$

Here, n is the number of pixels corresponding to the scene, i is the index of a pixel, and Zi is the Z value of the pixel specified by i.

The average value Zave, the standard deviation Zdev, and the like calculated by the determining condition generation unit 101 are used in processing for determining an antialiasing technique, which will be described later.

Next, the polygon data expansion unit 102 reads polygon data of the processing target scene from the polygon data buffer 111 in the memory 110 and expands the read polygon data into display coordinates (S202). Then, the representative point pixel data generation unit 103 generates pixel data including the Z value at a representative point of a pixel in a polygon rendering region (S203).

The antialiasing technique determination unit 104 determines an antialiasing technique applied to a pixel to be processed, using the determining conditions generated by the determining condition generation unit 101 and the Z value generated by the representative point pixel data generation unit 103 (S204).

Here, for example, the antialiasing technique determination unit 104 compares the Z value Zj of the pixel to be processed with the average value Zave generated by the determining condition generation unit 101. If Zj<Zave, a supersampling method is selected. If Zj≥Zave, a multi-sampling method is selected.

The average value Zave generated by the determining condition generation unit 101 varies from scene to scene. Thus, it is possible to avoid a situation in which the supersampling method is selected for all the pixels, thereby avoiding an explosive increase in the number of calculations. It is also possible to avoid a situation in which the multi-sampling method is selected for all the pixels, thereby avoiding degradation in the image quality. In other words, the antialiasing image generation apparatus 100 can generate a graphics image while avoiding an increase in the number of calculations and degradation in the image quality.

Alternatively, a median value of a plurality of Z values in a scene, for example, may be used instead of the average value Zave. This enables the antialiasing image generation apparatus 100 to select the two antialiasing techniques at the same rate.

Alternatively, for example, the antialiasing technique determination unit 104 may calculate the deviation value of the Z value Zj from the average value Zave and the standard deviation Zdev generated by the determining condition generation unit 101 and the Z value Zj of the pixel to be processed. A formula 3 is a calculation formula of TZj that is the deviation value of the Z value Zj.

$$TZj = 10 \times (Zj - Zave)/Zdev + 50 \qquad \text{(Formula 3)}$$

Then, the antialiasing technique determination unit 104 compares the deviation value TZj calculated by the formula 3 with a reference deviation value TZb that is a reference set in advance for assigning an antialiasing technique. If TZj<TZb, the antialiasing technique determination unit 104 selects the supersampling method. If TZj≥TZb, the antialiasing technique determination unit 104 selects the multi-sampling method.

Figure 7:
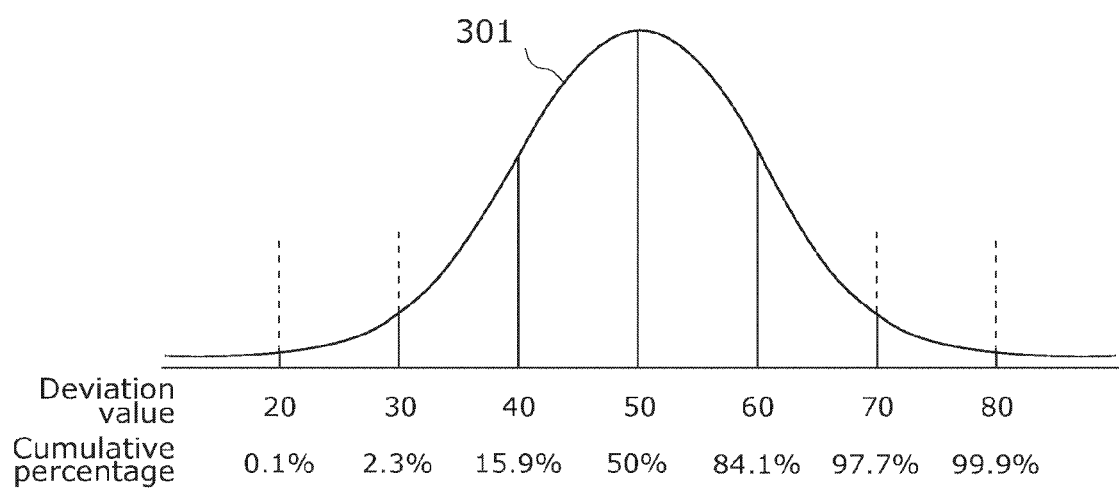
FIG. 7 illustrates the normal distribution curve, the deviation value, and the cumulative percentage according to Embodiment 1.

FIG. 7 shows a normal distribution curve 301, the deviation value, and a cumulative percentage. If the distribution of Z values is close to the normal distribution, the ratio at which each of the antialiasing techniques is selected can be derived based on the cumulative percentage of the normal distribution curve 301. For example, if the reference deviation value TZb is 40, the supersampling method is selected for 15.9 percent of the total number of pixels. Then, the multi-sampling method is selected for the remaining 84.1 percent of the pixels. By using the deviation value, the antialiasing image generation apparatus 100 can select the supersampling method and the multi-sampling method at a constant rate.

If the antialiasing technique determination unit 104 has selected the supersampling method ("SSAA" in S204), the supersampling subpixel generation unit 105 executes subpixel generation processing according to the supersampling method (S205). Then, the supersampling subpixel calculation unit 106 executes subpixel calculation processing according to the supersampling method (S206). The supersampling subpixel calculation unit 106 then outputs the calculated pixel data to the subpixel blending unit 109.

If, on the other hand, the antialiasing technique determination unit 104 has selected the multi-sampling method ("MSAA" in S204), the multi-sampling subpixel generation unit 107 executes subpixel generation processing according to the multi-sampling method (S207). Then, the multi-sampling subpixel calculation unit 108 executes subpixel calculation processing according to the multi-sampling method (S208). The multi-sampling subpixel calculation unit 108 then outputs the calculated pixel data to the subpixel blending unit 109.

The subpixel blending unit 109 acquires calculated pixel data of each subpixel from the supersampling subpixel calculation unit 106 or the multi-sampling subpixel calculation unit 108. Then, the subpixel blending unit 109 blends and merges the pixel data of subpixels into pixel data of each pixel. The subpixel blending unit 109 then stores the color value included in the pixel data of each pixel in the frame buffer 113 in the memory 110. The subpixel blending unit 109 also stores the Z value included in the pixel data of each pixel in the Z buffer 114 for rendering in the memory 110 (S209).

The antialiasing image generation apparatus 100 determines whether or not the processing (from S203 to S209) has been completed for all the pixels in the polygon (S210). If the processing has not been completed (No in S210), the antialiasing image generation apparatus 100 repeats the processing (from S203 to S209).

If the processing has been completed for all the pixels in the polygon (Yes in S210), the antialiasing image generation apparatus 100 determines whether or not processing (from S202 to S210) has been completed for all the polygons in the scene (S211). If the processing has not been completed (No in S211), the antialiasing image generation apparatus 100 repeats the processing (from S202 to S210). If the processing has been completed for all the polygons in the scene (Yes in S211), the antialiasing image generation apparatus 100 ends the processing for rendering the processing target scene.

The antialiasing image generation apparatus 100 according to this embodiment generates appropriate determining conditions in accordance with the distribution of a plurality of Z values in a scene. Then, the antialiasing image generation apparatus 100 selectively executes either the antialiasing technique characterized by high image quality but a large number of calculations (e.g., the above supersampling method) or the antialiasing technique characterized by a small number of calculations but low image quality (e.g., the above multi-sampling method) at a constant rate.

Through this, the antialiasing image generation apparatus 100 can appropriately adjust the balance between suppression of an increase in the processing load and suppression of degradation in the image quality.

Embodiment 2

Figure 8:
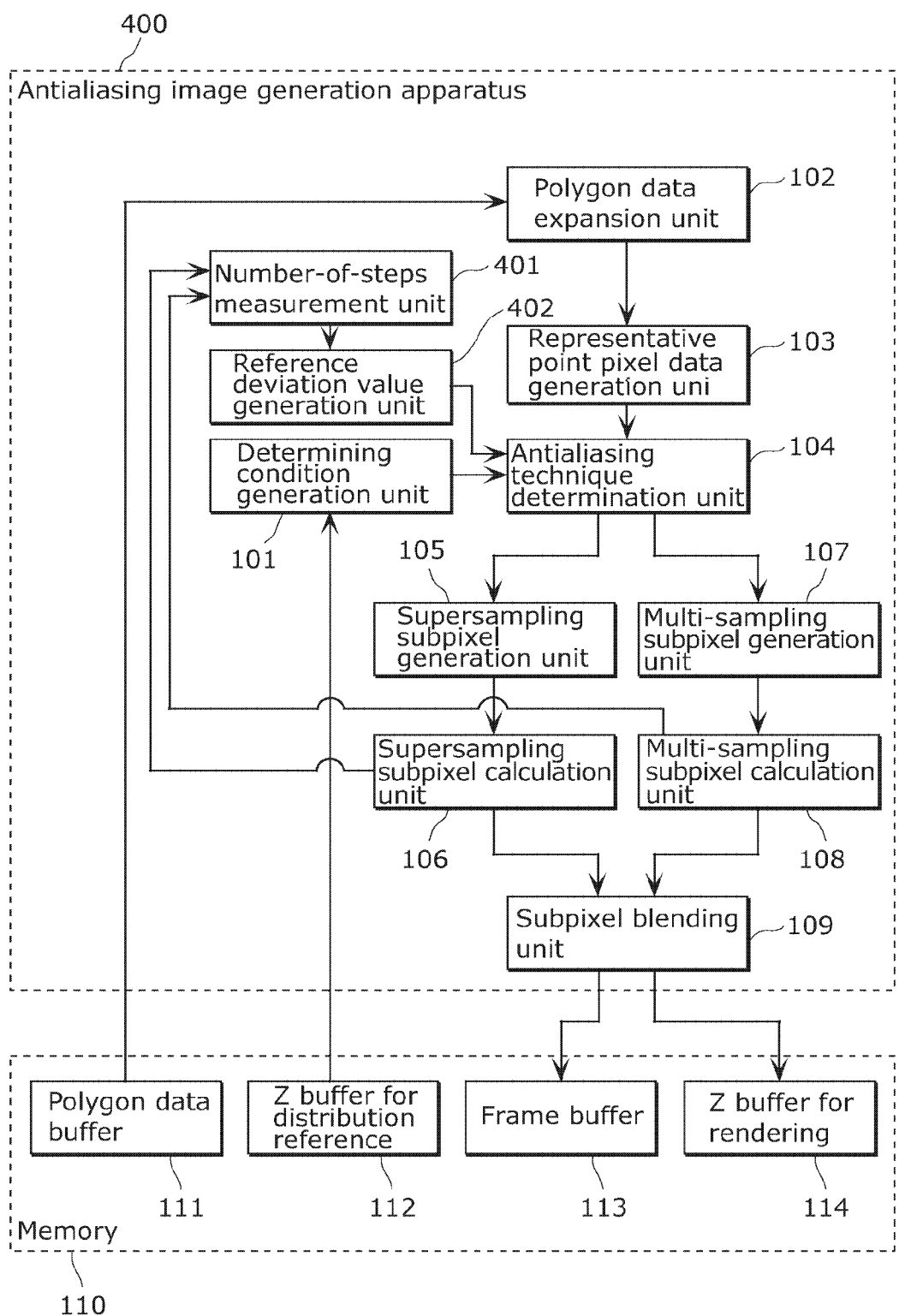
FIG. 8 is a block diagram showing an example of the configuration of an antialiasing image generation apparatus according to Embodiment 2.

FIG. 8 is a block diagram showing an example of the configuration of an antialiasing image generation apparatus according to this embodiment. An antialiasing image generation apparatus 400 in FIG. 8 includes a number-of-steps measurement unit 401 and a reference deviation value generation unit 402, in addition to the configuration of the antialiasing image generation apparatus 100 in FIG. 5. In the following description of this embodiment, constituent elements that are the same as those of the antialiasing image generation apparatus 100 in FIG. 5 are denoted by the same reference numerals, and a detailed description thereof has been omitted.

Figure 9:
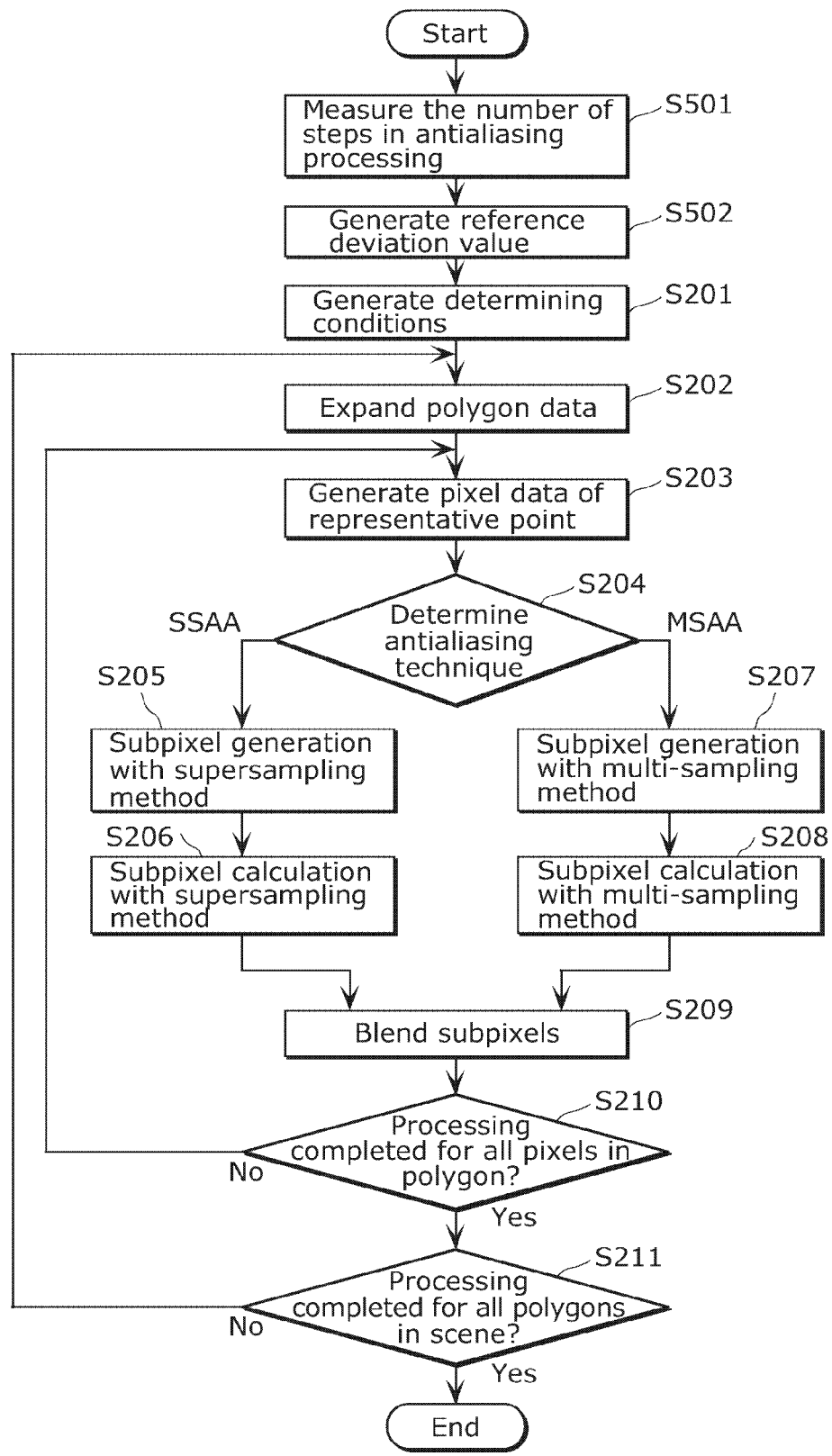
FIG. 9 is a flowchart showing an example of operations performed by the antialiasing image generation apparatus according to Embodiment 2.

FIG. 9 is a flowchart showing an example of operations performed by the antialiasing image generation apparatus 400 shown in FIG. 8.

First, the number-of-steps measurement unit 401 measures the number of processing steps executed per pixel by each of predetermined antialiasing techniques (S501).

In the case of a simple pixel shader program that includes neither conditional branch processing nor an arbitrary number of repeat processing, the number of processing steps per pixel is determined at the compile time. However, in the case of a pixel shader program that includes conditional branch processing or an arbitrary number of repeat processing, the number of processing steps per pixel cannot be determined at the compile time.

Thus, the number-of-steps measurement unit 401 measures the number of processing steps actually executed. Specifically, the number-of-steps measurement unit 401 measures the number of processing steps executed per pixel by each of the supersampling subpixel calculation unit 106 and the multi-sampling subpixel calculation unit 108 for a scene previous to a processing target scene.

Then, the number-of-steps measurement unit 401 outputs the number Ss of processing steps executed per pixel by the supersampling method and the number Sm of processing steps executed per pixel by the multi-sampling method to the reference deviation value generation unit 402.

Next, the reference deviation value generation unit 402 generates the reference deviation value TZb described in Embodiment 1 (S502).

As a specific example, the reference deviation value generation unit 402 acquires the number Sm of processing steps executed per pixel by the multi-sampling method and the number Ss of processing steps executed per pixel by the supersampling method from the number-of-steps measurement unit 401. The reference deviation value generation unit 402 then calculates a ratio Rs of the supersampling method based on an assumed number S of processing steps that is a permissible number of processing steps in order to ensure the processing speed per pixel. A formula 4 is a calculation formula of the ratio Rs.

$$Rs = 100 \times (S - Sm)/(Ss - Sm) [\%] \qquad \text{(Formula 4)}$$

Note that the reference deviation value generation unit 402 clamps the ratio Rs in the range of 0 to 100%. That is, if the calculation result is less than 0%, the reference deviation value generation unit 402 set the ratio Rs to 0%. If the calculation result exceeds 100%, the reference deviation value generation unit 402 sets the ratio Rs to 100%.

The reference deviation value generation unit 402 reversely looks up the deviation value by applying the ratio Rs to the cumulative percentage of the normal distribution curve 301 in FIG. 7. The reference deviation value generation unit 402 generates the derived deviation value as a reference deviation value TZb. For example, if the ratio Rs is 2.3%, the supersampling method is applied to 2.3 percent of the total number of pixels. The reference deviation value generation unit 402 applies this value to the cumulative percentage of the normal distribution curve 301 so as to reversely look up the deviation value. As a result, the reference deviation value TZb of 30 is obtained.

That is, the reference deviation value generation unit 402 generates a variable reference deviation value. Through this, the number of processing steps per pixel can be maintained constant during the processing for rendering a scene. Accordingly, the antialiasing image generation apparatus 400 can maintain performance regarding the processing speed for generating a graphics image.

The determining condition generation processing (S201) and subsequent processing in FIG. 9 are the same as the operations in FIG. 6, and therefore a description thereof has been omitted.

As described above, the antialiasing image generation apparatus 400 according to this embodiment measures the number of processing steps executed per pixel by each of antialiasing techniques (e.g., supersampling method and multi-sampling method) for a scene previous to a processing target scene. Then, the antialiasing image generation apparatus 400 calculates the ratio at which each of the antialiasing techniques is applied, based on the assumed number of processing steps per pixel. The antialiasing image generation apparatus 400 then inversely looks up the deviation value by applying the calculated ratio to the cumulative percentage of the normal distribution curve 301. Through this, the antialiasing image generation apparatus 400 generates the specified deviation value as a reference deviation value. As a result, the antialiasing image generation apparatus 400 can ensure performance regarding the processing speed for generating a graphics image.

While the antialiasing image generation apparatuses and the antialiasing image generation methods according to the invention have been described above based on Embodiments 1 and 2, the present invention is not intended to be limited to these embodiments. The present invention also includes embodiments that are obtained by making variations that are conceivable by those skilled in the art to the above embodiments, and other embodiments that can be implemented by any arbitrary combination of constituent elements of the above embodiments.

For example, the determining condition generation unit 101 uses the Z buffer for rendering in order to acquire distribution information regarding the distribution of a plurality of Z values. Alternatively, the determining condition generation unit 101 may use a plurality of Z values that are stored in an area different from the Z buffer. Specifically, the determining condition generation unit 101 may use a dedicated buffer for acquiring the distribution information. In a typical Z buffer, a plurality of Z values of pixels having the same X and Y coordinates are overwritten by the processing for rendering a scene, forming a single Z value.

However, using a plurality of Z values that are stored in a different area as described above enables the determining condition generation unit 101 to reference all the Z values. Accordingly, the determining condition generation unit 101 can generate determining conditions based on more information.

A plurality of Z values to be referenced by the determining condition generation unit 101 may be a plurality of Z values in a plurality of scenes. Through this, the determining condition generation unit 101 can acquire highly accurate distribution information and can more accurately generate determining conditions for assigning the antialiasing techniques.

Furthermore, the operation performed by the determining condition generation unit 101 is not limited to accumulating a plurality of Z values of all the pixels and calculating the average value Zave or the standard deviation Zdev of these Z values, and it may involve accumulating a plurality of Z values of a plurality of nearby pixels and calculating the average value Zave or the standard deviation Zdev of these Z values. Through this, the determining condition generation unit 101 can reduce the number of calculations performed when generating determining conditions.

The representative point pixel data generation unit 103 generates pixel data at a center point of pixels such as the above-described representative point O in FIG. 3. However, the position where the calculation is performed is not limited to the center point. Alternatively, the representative point pixel data generation unit 103 may also generate common pixel data for a plurality of nearby pixels. Then, the antialiasing technique determination unit 104 may use the common pixel data for a plurality of nearby pixels. Through this, the representative point pixel data generation unit 103 and the antialiasing technique determination unit 104 can reduce the numbers of calculations.

The antialiasing technique determined by the antialiasing technique determination unit 104 is not limited to either the supersampling method or the multi-sampling method described in the above embodiments. For example, an antialiasing technique with a higher image quality, such as calculating Z values, color values, and the like of eight sample points in each single pixel, may be made selectable. Conversely, an antialiasing technique with a smaller number of calculations, such as calculating Z values, color values, and the like of two sample points in each single pixel, may be made selectable.

A difference among a plurality of antialiasing techniques is not limited to the number of sample points, but may, for example, be the accuracy of calculation of pixel data or the speed of calculation of pixel data.

For example, the antialiasing image generation apparatus may select, for pixel data of forward pixels, an antialiasing technique that executes high-precision but low-speed calculation processing (specifically, 32-bit precision calculations are performed with a predetermined degree of parallelism). On the other hand, the antialiasing image generation apparatus may select, for pixel data of backward pixels, an antialiasing technique that executes low-precision but high-speed calculation processing (e.g., 8-bit precision calculations are performed with four times the predetermined degree of parallelism).

The antialiasing image generation apparatus may select an antialiasing technique applied to a pixel to be processed from among three or more antialiasing techniques. By selecting an antialiasing technique from among a larger number of antialiasing techniques, the antialiasing image generation apparatus can execute appropriate antialiasing processing.

The number-of-steps measurement unit 401 may measure the number of processing steps per pixel that includes not only the number of processing steps performed in the subpixel calculation processing but also the number of steps performed in the subpixel generation processing and the subpixel blending processing. This increases the measurement accuracy of the number of steps. Accordingly, the reference deviation value generation unit 402 can more accurately generate the reference deviation value for maintaining performance.

Also, some or all of a plurality of constituent elements included in the antialiasing image generation apparatuses 100 and 400 in FIGS. 5 and 8 may be parallelized or pipelined or may be merged into a single constituent element. Some of the constituent elements may not be provided or may be changed.

Also, other names may be assigned to the constituent elements, the data, and the information described in the above embodiments.

Hereinafter, a plurality of other embodiments will be further illustrated. Antialiasing image generation apparatuses described below include main constituent elements of the antialiasing image generation apparatuses described in the above embodiments.

Embodiment 3

Figure 10:
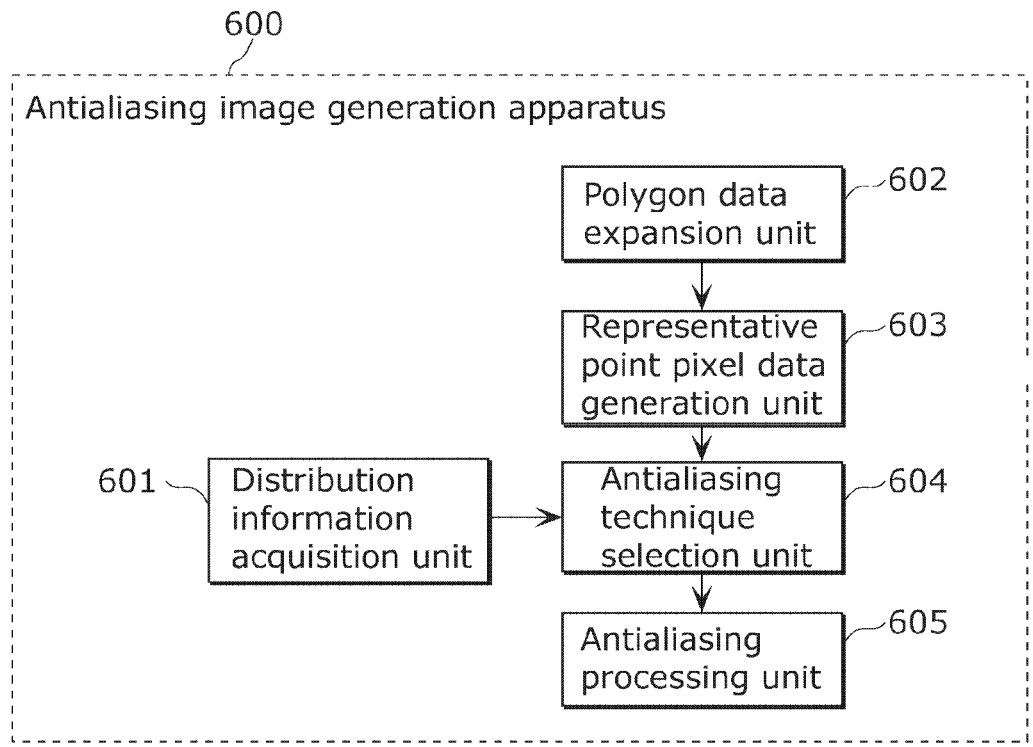
FIG. 10 is a block diagram showing an example of the configuration of an antialiasing image generation apparatus according to Embodiment 3.

FIG. 10 is a block diagram showing an example of the configuration of an antialiasing image generation apparatus according to Embodiment 3.

An antialiasing image generation apparatus 600 shown in FIG. 10 renders a three-dimensional image constituted by polygons in three-dimensional space in a two-dimensional plane. The three-dimensional space has a depth represented by Z values. The antialiasing image generation apparatus 600 performs antialiasing processing for smoothly displaying polygons when a three-dimensional image is rendered in a two-dimensional plane. Through this, the antialiasing image generation apparatus 600 generates a graphics image on which the antialiasing processing has been performed.

The antialiasing image generation apparatus 600 includes a distribution information acquisition unit 601, a polygon data expansion unit 602, a representative point pixel data generation unit 603, an antialiasing technique selection unit 604, and an antialiasing processing unit 605.

Figure 11:
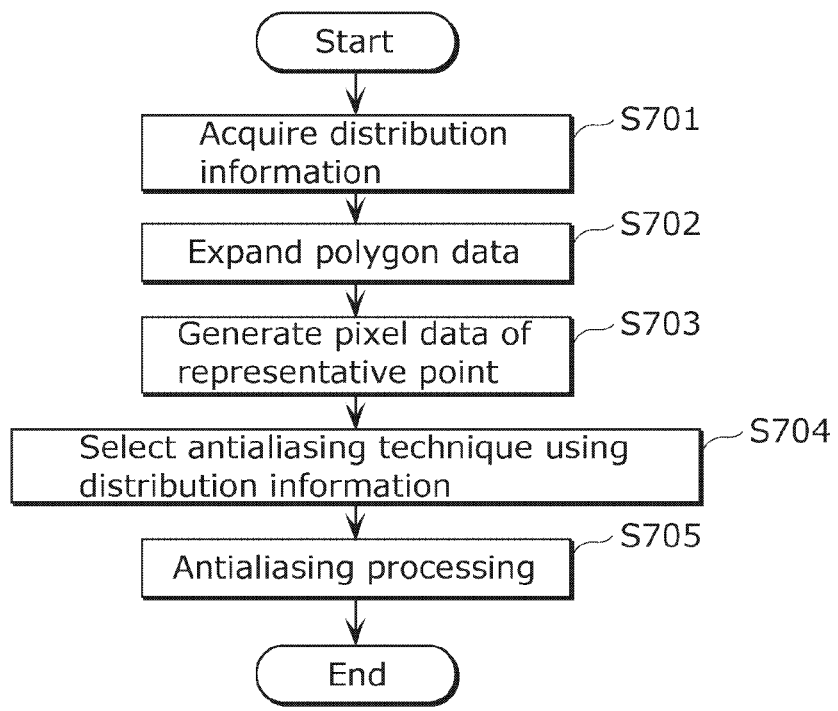
FIG. 11 is a flowchart showing an example of operations performed by the antialiasing image generation apparatus according to Embodiment 3.

FIG. 11 is a flowchart showing an example of operations performed by the antialiasing image generation apparatus 600 shown in FIG. 10.

First, the distribution information acquisition unit 601 acquires distribution information (S701). The distribution information is information that indicates the distribution of a plurality of Z values in a three-dimensional image.

Next, the polygon data expansion unit 602 reads polygon data from a memory. The polygon data is data that indicates a polygon. Then, the polygon data expansion unit 602 expands the read polygon data into display coordinates (S702).

Then, for each of pixels in a polygon rendering region, the representative point pixel data generation unit 603 generates pixel data from the polygon data expanded by the polygon data expansion unit 602 (S703). The pixel data is data that includes the Z value at a representative point of the pixel. Then, for each of the plurality of pixels, the antialiasing technique selection unit 604 selects an antialiasing technique applied to the pixel from among a plurality of antialiasing techniques that each require a different number of calculations per pixel (S704).

At this time, the antialiasing technique selection unit 604 selects an antialiasing technique using the Z value included in the pixel data generated corresponding to the pixel by the representative point pixel data generation unit 603 and the distribution information acquired by the distribution information acquisition unit 601. For example, the antialiasing technique selection unit 604 may select an antialiasing technique by comparing the Z value with a threshold value that is determined from the distribution information. Alternatively, the antialiasing technique selection unit 604 may select an antialiasing technique based on an index such as the deviation value that is calculated from the distribution information and the Z value.

Lastly, for each of the plurality of pixels, the antialiasing processing unit 605 performs antialiasing processing on the pixel according to the antialiasing technique selected corresponding to the pixel by the antialiasing technique selection unit 604. As a result, the antialiasing processing unit 605 generates a graphics image on which the antialiasing processing has been performed (S705).

Through the above-described operations, the antialiasing image generation apparatus 600 can execute the antialiasing processing while appropriately adjusting the balance between suppression of an increase in the processing load and suppression of degradation in the image quality.

Note that the distribution information acquisition unit 601 corresponds to the determining condition generation unit 101 described in Embodiments 1 and 2. That is, the distribution information acquisition unit 601 may execute the same processing as the determining condition generation unit 101.

The polygon data expansion unit 602 corresponds to the polygon data expansion unit 102 described in Embodiments 1 and 2. That is, the polygon data expansion unit 602 may execute the same processing as the polygon data expansion unit 102.

The representative point pixel data generation unit 603 corresponds to the representative point pixel data generation unit 103 described in Embodiments 1 and 2. That is, the representative point pixel data generation unit 603 may execute the same processing as the representative point pixel data generation unit 103.

The antialiasing technique selection unit 604 corresponds to the antialiasing technique determination unit 104 described in Embodiments 1 and 2. That is, the antialiasing technique selection unit 604 may execute the same processing as the antialiasing technique determination unit 104.

The antialiasing processing unit 605 corresponds to the supersampling subpixel generation unit 105, the supersampling subpixel calculation unit 106, the multi-sampling subpixel generation unit 107, the multi-sampling subpixel calculation unit 108, and the subpixel blending unit 109 described in Embodiments 1 and 2. That is, the antialiasing processing unit 605 may execute the same processing as the supersampling subpixel generation unit 105, the supersampling subpixel calculation unit 106, the multi-sampling subpixel generation unit 107, the multi-sampling subpixel calculation unit 108, and the subpixel blending unit 109.

The distribution information acquisition unit 601 may acquire the distribution information from a Z buffer. In the Z buffer, a plurality of Z values in a three-dimensional image that serves as a current rendering target may be stored. Alternatively, a plurality of Z values in a three-dimensional image that serves as a past rendering target may be stored in the Z buffer. Also, the distribution information acquisition unit 601 may acquire an average value of a plurality of Z values or a median value of a plurality of Z values as the distribution information.

The antialiasing technique selection unit 604 may determine a threshold value, using the distribution information acquired by the distribution information acquisition unit 601. If the Z value included in the pixel data is the same as the threshold value or indicates a more forward position that the threshold value, the antialiasing technique selection unit 604 may select a first antialiasing technique. If the Z value included in the pixel data indicates a more backward position than the threshold value, the antialiasing technique selection unit 604 may select a second antialiasing technique that requires a smaller number of calculations per pixel than the first antialiasing technique.

If the Z value included in the pixel data is the same as the threshold value or indicates a more forward position than the threshold value, the antialiasing technique selection unit 604 may select a supersampling method as the first antialiasing technique. If the Z value included in the pixel data indicates a more backward position than the threshold value, the antialiasing technique selection unit 604 may select a multi-sampling method as the second antialiasing technique.

As described above, the antialiasing technique selection unit 604 selects an antialiasing technique from among a plurality of antialiasing techniques that each require a different number of calculations per pixel. However, the number of calculations executed per pixel according to these antialiasing techniques may be the same. Even if the number of calculations executed per pixel according to a plurality of antialiasing techniques is the same, it is still possible to appropriately adjust the balance between suppression of an increase in the processing load and suppression of degradation in the image quality through the aforementioned procedure.

For example, even if a plurality of antialiasing techniques each require a different number of accesses to the memory per pixel, the balance between suppression of an increase in the processing load and suppression of degradation in the image quality can appropriately be adjusted through the aforementioned procedure. The same applies to the case in which a plurality of antialiasing techniques achieve different image qualities.

Embodiment 4

Figure 12:
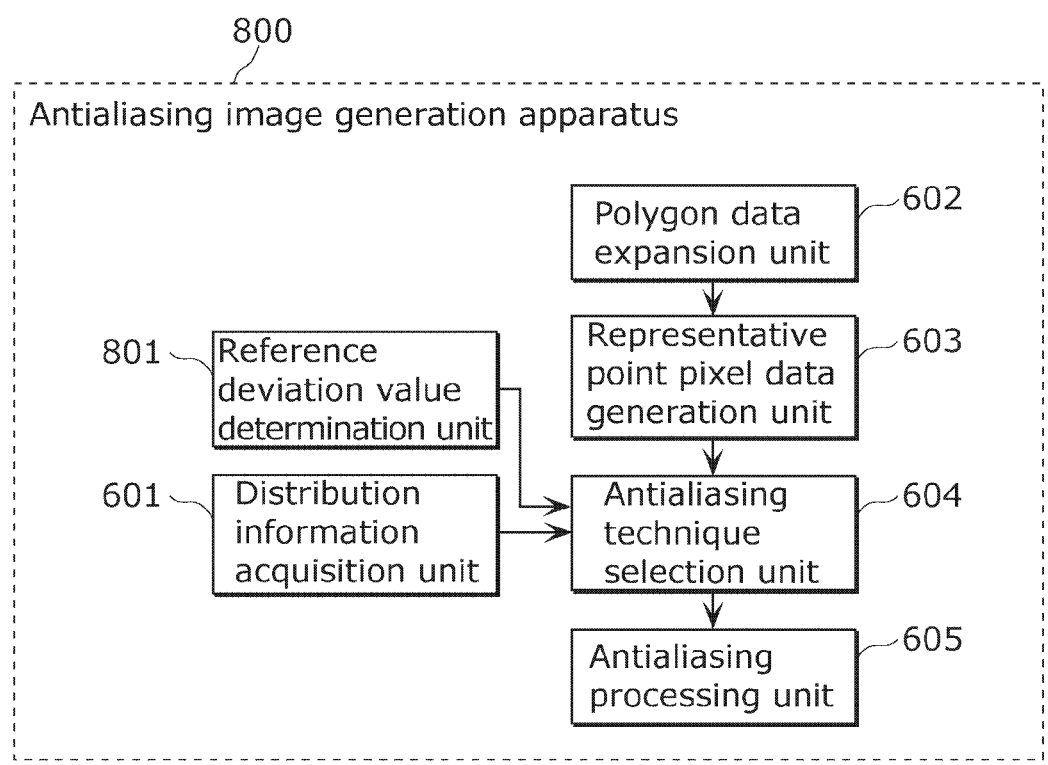
FIG. 12 is a block diagram showing an example of the configuration of an antialiasing image generation apparatus according to Embodiment 4.

FIG. 12 is a block diagram showing an example of the configuration of an antialiasing image generation apparatus according to Embodiment 4. An antialiasing image generation apparatus 800 shown in FIG. 12 includes a reference deviation value determination unit 801 in addition to the configuration of the antialiasing image generation apparatus 600 shown in FIG. 10.

The reference deviation value determination unit 801 determines a reference deviation value. The reference deviation value is a deviation value that serves as a reference for selecting an antialiasing technique from among a plurality of antialiasing techniques.

The distribution information acquisition unit 601 according to Embodiment 4 acquires an average value and a standard deviation of a plurality of Z values as distribution information.

The antialiasing technique selection unit 604 according to Embodiment 4 calculates, for each of pixels, the deviation value of the Z value included in the pixel data generated corresponding to the pixel by the representative point pixel data generation unit 603, using the average value and the standard deviation acquired by the distribution information acquisition unit 601. Then, the antialiasing technique selection unit 604 selects an antialiasing technique applied to the pixel, using the deviation value calculated corresponding to the pixel and the reference deviation value determined by the reference deviation value determination unit 801.

Figure 13:
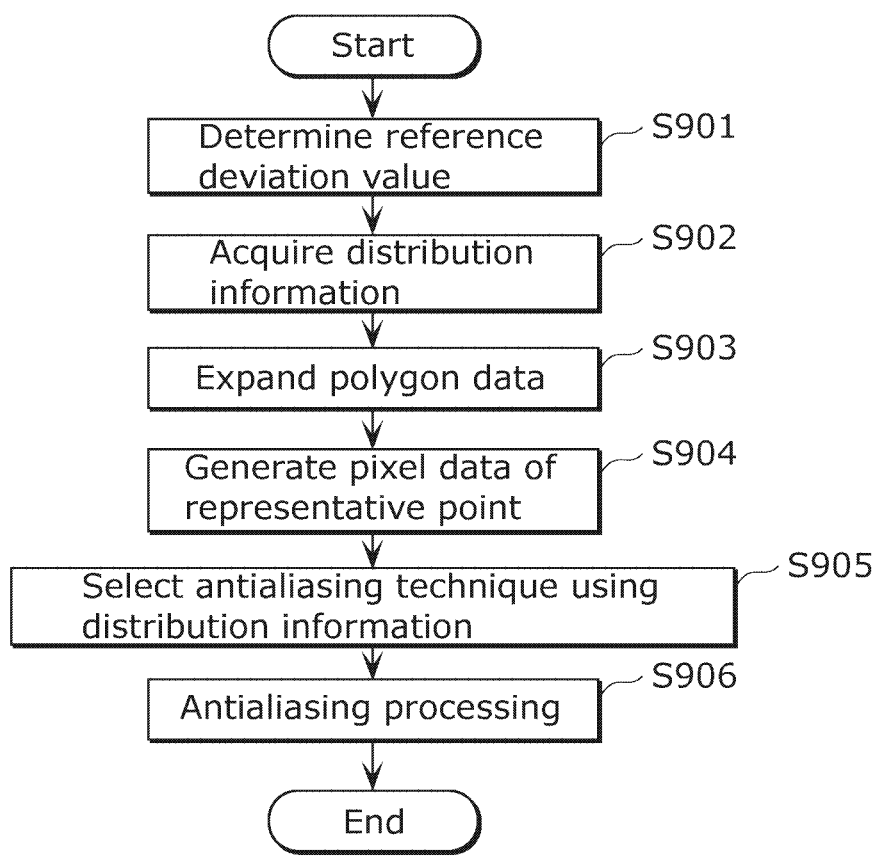
FIG. 13 is a flowchart showing an example of operations performed by the antialiasing image generation apparatus according to Embodiment 4.

FIG. 13 is a flowchart showing an example of operations performed by the antialiasing image generation apparatus 800 shown in FIG. 12.

First, the reference deviation value determination unit 801 determines a reference deviation value (S901). Next, the distribution information acquisition unit 601 acquires an average value and a standard deviation of a plurality of Z values as distribution information (S902).

Then, the polygon data expansion unit 602 reads polygon data from a memory. The polygon data expansion unit 602 then expands the read polygon data into display coordinates (S903). Next, for each of pixels in a polygon rendering region, the representative point pixel data generation unit 603 generates pixel data including the Z value at a representative point of the pixel from the polygon data expanded by the polygon data expansion unit 602 (S904).

Then, for each of the plurality of pixels, the antialiasing technique selection unit 604 calculates the deviation value of the Z value included in the pixel data generated corresponding to the pixel by the representative point pixel data generation unit 603. At this time, the antialiasing technique selection unit 604 uses the average value and the standard deviation acquired by the distribution information acquisition unit 601. The antialiasing technique selection unit 604 then selects an antialiasing technique applied to the pixel, using the deviation value calculated corresponding to the pixel and the reference deviation value determined by the reference deviation value determination unit 801 (S905).

Lastly, for each of the plurality of pixels, the antialiasing processing unit 605 performs antialiasing processing on the pixel according to the antialiasing technique selected corresponding to the pixel by the antialiasing technique selection unit 604. As a result, the antialiasing processing unit 605 generates a graphics image on which the antialiasing processing has been performed (S906).

Through the above-described operations, the antialiasing image generation apparatus 800 can execute the antialiasing processing while appropriately adjusting the balance between suppression of an increase in the processing load and suppression of degradation in the image quality.

Note that the reference deviation value determination unit 801 corresponds to the reference deviation value generation unit 402 described in Embodiment 2. That is, the reference deviation value determination unit 801 may execute the same processing as the reference deviation value generation unit 402.

The reference deviation value determination unit 801 may determine a ratio at which each of antialiasing techniques is selected, based on the assumed number of processing steps and the number of processing steps executed. Here, the assumed number of processing steps refers to the number of processing steps assumed to be executed per pixel as an objective. The number of processing steps executed refers to the number of processing steps executed per pixel according to each of the antialiasing techniques. The reference deviation value determination unit 801 may determine the reference deviation value by comparing the determined ratio with the cumulative percentage of the normal distribution curve.

Here, the number of processing steps executed is not limited to the number of steps actually executed and may be the planned number of steps to be executed. The reference deviation value determination unit 801 may arbitrarily determine the reference deviation value irrespective of the assumed number of processing steps and the number of processing steps executed. For example, the reference deviation value may be set from outside. In this case, the reference deviation value determination unit 801 determines the reference deviation value based on input from outside.

If the calculated deviation value is the same as the reference deviation value or indicates a more forward position than the reference deviation value, the antialiasing technique selection unit 604 according to Embodiment 4 may select a first antialiasing technique. If the calculated deviation value indicates a more backward position than the reference deviation value, the antialiasing technique selection unit 604 may select a second antialiasing technique that requires a smaller number of calculations per pixel than the first antialiasing technique.

If the calculated deviation value is the same as the reference deviation value or indicates a more forward position than the reference deviation value, the antialiasing technique selection unit 604 may select a supersampling method as the first antialiasing technique. If the calculated deviation value indicates a more backward position than the reference deviation value, the antialiasing technique selection unit 604 may select a multi-sampling method as the second antialiasing technique.

Embodiment 5

Figure 14:
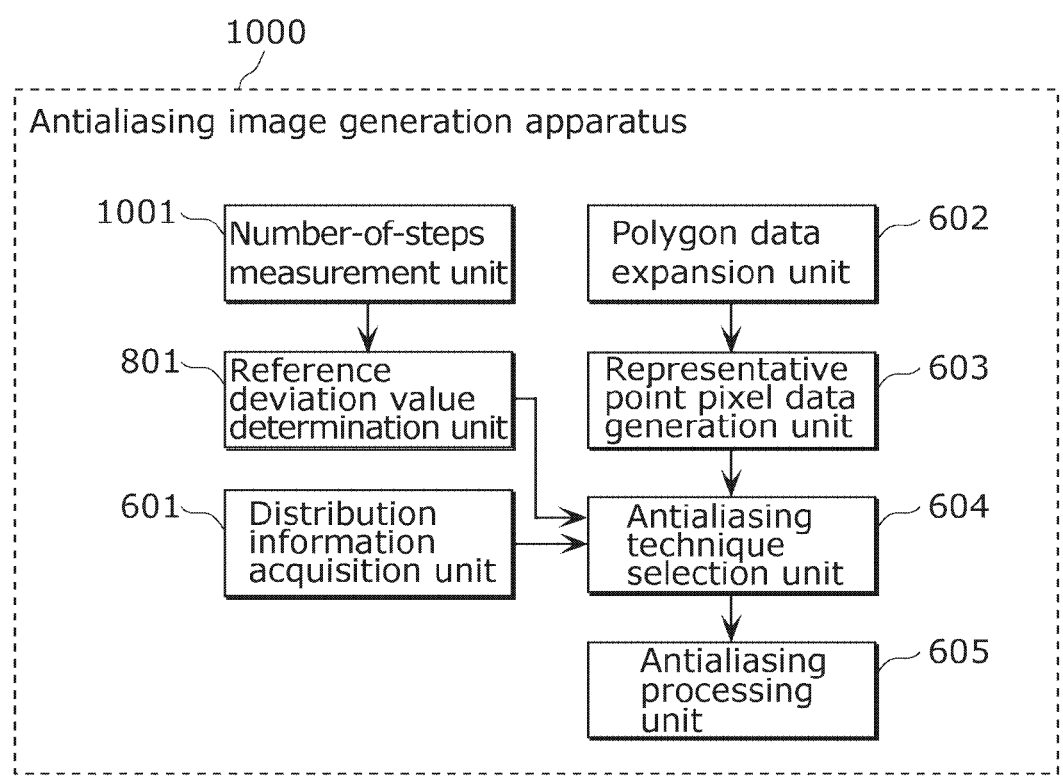
FIG. 14 is a block diagram showing an example of the configuration of an antialiasing image generation apparatus according to Embodiment 5.

FIG. 14 is a block diagram showing an example of the configuration of an antialiasing image generation apparatus according to Embodiment 5. An antialiasing image generation apparatus 1000 shown in FIG. 14 includes a number-of-steps measurement unit 1001 in addition to the configuration of the antialiasing image generation apparatus 800 shown in FIG. 12.

The number-of-steps measurement unit 1001 measures the number of processing steps executed. The number of processing steps executed according to Embodiment 5 refers to the number of processing steps executed per pixel according to each of antialiasing techniques.

The reference deviation value determination unit 801 according to Embodiment 5 determines a ratio at which each of antialiasing techniques is selected, from the assumed number of processing steps and the number of processing steps executed. The assumed number of processing steps refers to the number of processing steps assumed to be executed per pixel as an objective. The number of processing steps executed refers to the number of processing steps executed per pixel according to each of antialiasing techniques.

At this time, the reference deviation value determination unit 801 uses the number of processing steps executed that has been measured by the number-of-steps measurement unit 1001 when a three-dimensional image that serves as a past rendering target has been rendered. The reference deviation value determination unit 801 then determines the reference deviation value by comparing the determined ratio with the cumulative percentage of the normal distribution curve.

Figure 15:
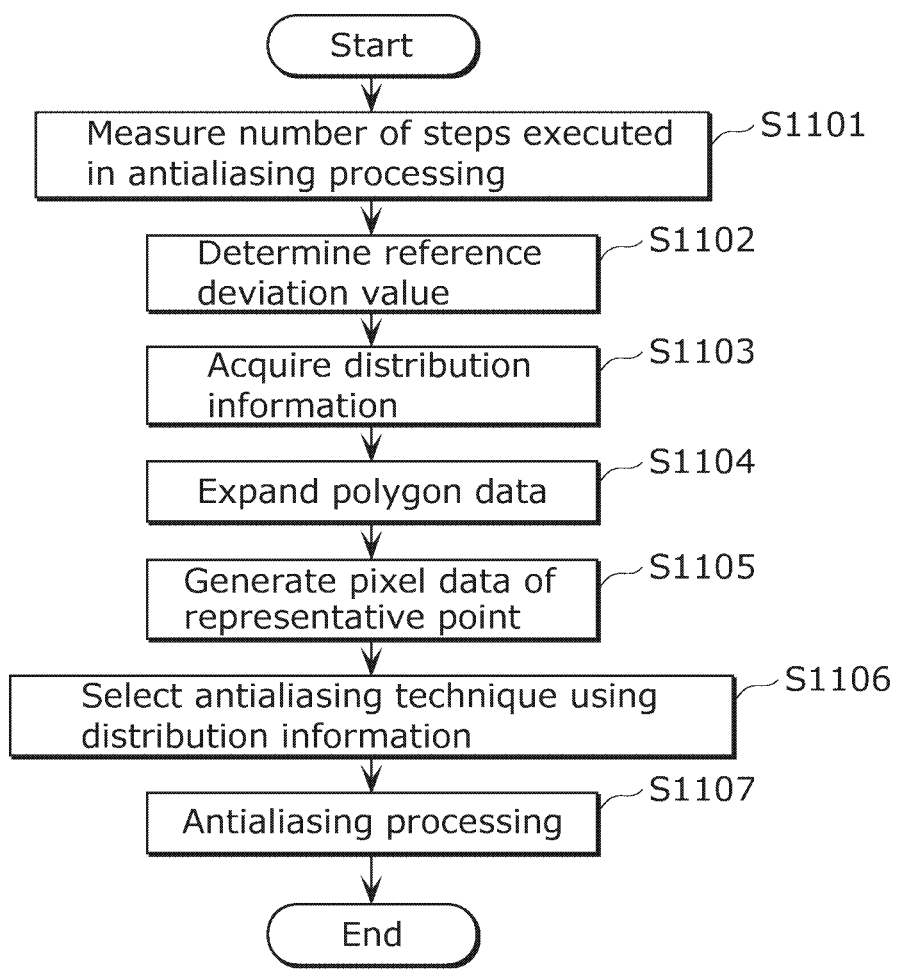
FIG. 15 is a flowchart showing an example of operations performed by the antialiasing image generation apparatus according to Embodiment 5.

FIG. 15 is a flowchart showing an example of operations performed by the antialiasing image generation apparatus 1000 shown in FIG. 14.

First, the number-of-steps measurement unit 1001 measures the number of processing steps executed (S1101). Next, the reference deviation value determination unit 801 determines the ratio from the assumed number of processing steps and the number of processing steps executed. At this time, the reference deviation value determination unit 801 uses the number of processing steps executed that has been measured by the number-of-steps measurement unit 1001 when a three-dimensional image serving as a past rendering target has been rendered. Then, the reference deviation value determination unit 801 determines the reference deviation value by comparing the determined ratio with the cumulative percentage of the normal distribution curve (S1102).

Next, the distribution information acquisition unit 601 acquires an average value and a standard deviation of a plurality of Z values as distribution information (S1103). Then, the polygon data expansion unit 602 reads polygon data from a memory. The polygon data expansion unit 602 then expands the read polygon data into display coordinates (S1104). Then, the representative point pixel data generation unit 603 generates pixel data from the polygon data expanded by the polygon data expansion unit 602 (S1105).

Next, the antialiasing technique selection unit 604 calculates the deviation value of the Z value included in the pixel data, using the average value and the standard deviation acquired by the distribution information acquisition unit 601. Then, the antialiasing technique selection unit 604 selects an antialiasing technique using the calculated deviation value and the reference deviation value determined by the reference deviation value determination unit 801 (S1106).

Lastly, the antialiasing processing unit 605 executes antialiasing processing on the pixel to be processed according to the antialiasing technique selected by the antialiasing technique selection unit 604 (S1107).

Through the above-described operations, the antialiasing image generation apparatus 1000 can execute antialiasing processing while appropriately adjusting the balance between suppression of an increase in the processing load and suppression of degradation in the image quality.

Note that the number-of-steps measurement unit 1001 corresponds to the number-of-steps measurement unit 401 described in Embodiment 2. That is, the number-of-steps measurement unit 1001 may execute the same processing as the number-of-steps measurement unit 401.

Embodiment 6

An information processing apparatus according to this embodiment includes one of the antialiasing image generation apparatuses described in the above embodiments as an integrated circuit.

Figure 16:
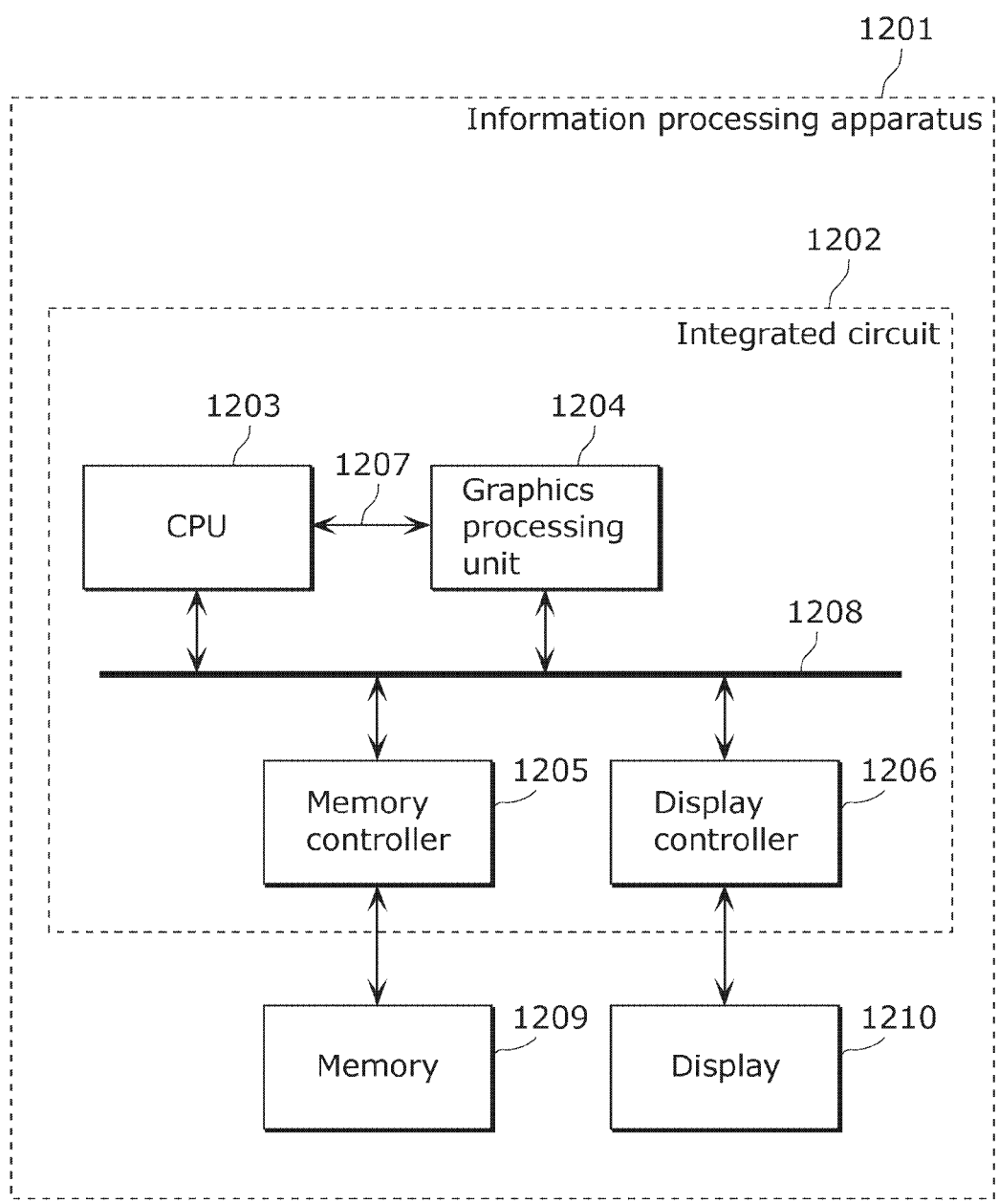
FIG. 16 is a block diagram showing an example of the configuration of an information processing apparatus according to Embodiment 6.

FIG. 16 is a block diagram showing a configuration of the information processing apparatus according to this embodiment. An information processing apparatus 1201 shown in FIG. 16 includes one of the antialiasing image generation apparatuses described in the above embodiments. The information processing apparatus 1201 includes an integrated circuit 1202, a memory 1209, and a display 1210.

The integrated circuit 1202 is, for example, a system large-scale integration (LSI) that includes a CPU 1203, a graphics processing unit 1204, a memory controller 1205, a display controller 1206, a CPU bus 1207, and a memory bus 1208. The graphics processing unit 1204 is one of the antialiasing image generation apparatuses described in the above embodiments.

The CPU 1203 stores polygon data in the memory 1209 via the memory bus 1208 and the memory controller 1205. The CPU 1203 also transmits a rendering instruction to the graphics processing unit 1204 via the CPU bus 1207.

The graphics processing unit 1204 accesses the memory 1209 via the memory bus 1208 and the memory controller 1205. The memory 1209 includes a polygon data buffer 111, a Z buffer 112 for distribution reference, a frame buffer 113, and a Z buffer 114 for rendering. The graphics processing unit 1204 executes the above-described antialiasing image generation processing. After the antialiasing image generation processing, the graphics processing unit 1204 outputs a graphics image to the display 1210 via the display controller 1206.

A plurality of constituent elements included in the integrated circuit 1202 in FIG. 16, such as the CPU 1203 and the graphics processing unit 1204, may be each individually constituted as an integral circuit. Alternatively, some or all of the constituent elements may be constituted as a single integrated circuit. The integrated circuit 1202 may include other constituent elements such as an audio visual (AV) processing unit and a streaming processing unit. The memory 1209 may be installed in the integrated circuit 1202. Also, the memory 1209 may be constituted by a plurality of memories, irrespective of whether it is inside or outside the integrated circuit 1202.

Embodiment 7

This embodiment describes an example of an integrated circuit that includes constituent elements of the above-described antialiasing image generation apparatuses.

Figure 17:
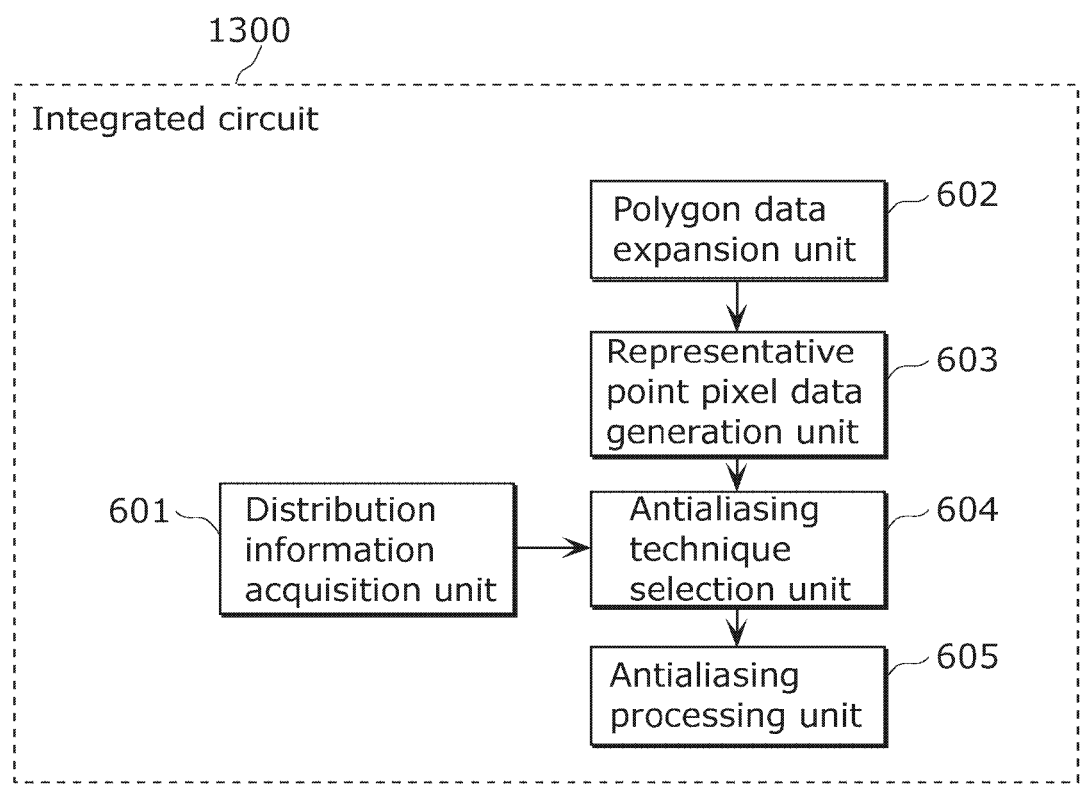
FIG. 17 is a block diagram showing an example of the configuration of an integrated circuit according to Embodiment 7.

FIG. 17 is a block diagram showing an example of the configuration of the integrated circuit according to this embodiment. An integrated circuit 1300 shown in FIG. 17 includes a distribution information acquisition unit 601, a polygon data expansion unit 602, a representative point pixel data generation unit 603, an antialiasing technique selection unit 604, and an antialiasing processing unit 605.

In other words, the integrated circuit 1300 includes the same constituent elements as the antialiasing image generation apparatus 600 shown in FIG. 10 and executes the same processing. Accordingly, the integrated circuit 1300 can execute antialiasing processing while appropriately adjusting the balance between suppression of an increase in the processing load and suppression of degradation in the image quality.

This embodiment also describes an example in which the antialiasing image generation apparatus 600 described in Embodiment 3 is implemented as an integrated circuit. It is, however, noted that the antialiasing image generation apparatuses described in the other embodiments may be implemented as integrated circuits. Alternatively, the antialiasing image generation apparatus may be realized by a program running on a general-purpose processor.

As another alternative, the antialiasing image generation apparatus may be realized by a field programmable gate array (FPGA) that can change its hardware configuration after manufacture. The antialiasing image generation apparatus may also be realized by a reconfigurable processor that can reconfigure connections and settings of circuit cells in the integrated circuit.

The present invention can also be realized as a recording medium in which the above program is stored, such as a computer-readable compact disc-read only memory (CD-ROM), or can be realized as information, data, or signals indicating that program. Such a program, information, data, and signals may be distributed via a communication network such as the Internet.

While the above has been a description of the antialiasing image generation apparatuses according to one or a plurality of aspects of the present invention based on a plurality of embodiments, the present invention is not intended to be limited to these embodiments. It should be noted that modes obtained by making modifications that are conceivable by those skilled in the art to these embodiments and other modes constructed by an arbitrary combination of constituent elements of these different embodiments may also be included within the scope of one or a plurality of aspects of the present invention unless they deviate from the gist of the present invention.

For example, the processing executed by a specific processing unit may be executed by another processing unit. It is also possible to change the sequence in which the processes are executed or to execute a plurality of processes in parallel.

The present invention can be realized not only as an antialiasing image generation apparatus but also as a method that replaces the processing units of an antialiasing image generation apparatus with steps. Typically, the steps included in such a method are executed by a computer. The present invention can be realized as a program for causing a computer to execute the steps included in such a method. The present invention can also be realized as a computer-readable recording medium for recording that program, such as a CD-ROM.

A plurality of constituent elements included in the antialiasing image generation apparatuses may be realized as an LSI that serves as an integrated circuit. These constituent elements may be each individually packaged in a single chip, or some or all of the constituent elements may be packaged in a single chip. While the LSI is taken as an example, it may be referred to as an integrated circuit (IC), a system LSI, a super LSI, or an ultra LSI depending on the difference in the number of components per chip.

The technique for achieving an integrated circuit is not limited to LSI technology, and it may be realized by a dedicated circuit or a general-purpose processor. It is also possible to use a programmable FPGA, or a reconfigurable processor that can reconfigure connections and settings of circuit cells in the LSI.

If another integrated circuit technology that replaces LSI technology comes along due to advancements in semiconductor technology or other spin-off technology, naturally such technology may be used for the circuit integration of constituent elements included in an antialiasing image generation apparatus.

As described above, in the above respective embodiments, the respective constituent elements may be constituted by dedicated hardware or may be realized by executing software programs suited for the respective constituent elements. The respective constituent elements may also be realized by a program execution unit such as a CPU or a processor reading a software program recorded in a recording medium such as a hard disk or a semiconductor memory and executing that program. Here, software that can realize the antialiasing image generation apparatuses of the above respective embodiments and the like is the following program.

Specifically, the program causes a computer to execute an antialiasing image generation method for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane. The antialiasing image generation method includes acquiring distribution information that indicates a distribution of a plurality of Z values in the three-dimensional image, reading polygon data indicating the polygon from a memory and expanding the read polygon data into display coordinates, for each of pixels in a region where the polygon has been rendered, generating pixel data that includes a Z value at a representative point of the pixel from the polygon data expanded in the expansion, for each of the pixels, selecting an antialiasing technique applied to the pixel from among a plurality of antialiasing techniques, using the Z value included in the pixel data generated corresponding to the pixel in the generation and the distribution information acquired in the acquisition, and generating the graphics image by, for each of the pixels, performing the antialiasing processing on the pixel according to the antialiasing technique selected corresponding to the pixel in the selection.

INDUSTRIAL APPLICABILITY

The antialiasing image generation apparatus and the antialiasing image generation method according to the present invention can be used in various types of electronic equipment provided with a graphics rendering function, such as a mobile phone, a personal digital assistant (PDA), a digital television, a car navigation system, a consumer game machine, and a personal computer.

REFERENCE SIGNS LIST

100, 400, 600, 800, 1000 Antialiasing image generation apparatus

101 Determining condition generation unit
102, 602 Polygon data expansion unit
103, 603 Representative point pixel data generation unit
104 Antialiasing technique determination unit
105 Supersampling subpixel generation unit
106 Supersampling subpixel calculation unit
107 Multi-sampling subpixel generation unit
108 Multi-sampling subpixel calculation unit
109 Subpixel blending unit
110, 1209 Memory
111 Polygon data buffer
112 Z buffer for distribution reference
113 Frame buffer
114 Z buffer for rendering
301 Normal distribution curve
401, 1001 Number-of-steps measurement unit
402 Reference deviation value generation unit
601 Distribution information acquisition unit
604 Antialiasing technique selection unit
605 Antialiasing processing unit
801 Reference deviation value determination unit
1201 Information processing apparatus
1202, 1300 Integrated circuit
1203 CPU
1204 Graphics processing unit
1205 Memory controller
1206 Display controller
1207 CPU bus
1208 Memory bus
1210 Display
9901 Point of view
9902 Visible space
9903 Plane
9904, 9905 Space

The invention claimed is:

1. An antialiasing image generation apparatus for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane, the antialiasing image generation apparatus comprising:
a processor; and
a non-transitory memory having stored thereon executable instructions, which when executed, cause said processor to perform:
acquiring an average value of a plurality of Z values in the three-dimensional image;
reading polygon data indicating the polygon from a memory and expanding expand the read polygon data into display coordinates;
generating, for each of a plurality of pixels in a region where the polygon has been rendered, pixel data that includes a Z value at a representative point of the pixel from the polygon data expanded in said expanding;
selecting, for each of the pixels, an antialiasing technique applied to the pixel from among a plurality of antialiasing techniques, using the Z value included in the pixel data generated corresponding to the pixel in said generating and the average value acquired in said acquiring; and
generating the graphics image by, for each of the pixels, performing the antialiasing processing on the pixel according to the antialiasing technique selected corresponding to the pixel in said selecting,
wherein said selecting includes (i) determining a threshold value using the average value acquired in said acquiring, (ii) when the Z value included in the pixel data is the same as the threshold value or smaller than the threshold value, selecting a first antialiasing technique, and (iii) when the Z value included in the pixel data is greater than the threshold value, selecting a second antialiasing technique that requires a smaller number of calculations per pixel than the first antialiasing technique.

2. The antialiasing image generation apparatus according to claim 1,
wherein said selecting selects the antialiasing technique from among the antialiasing techniques that each require a different number of calculations per pixel.

3. The antialiasing image generation apparatus according to claim 1,
wherein said acquiring acquires the average value from a Z buffer in which the Z values in the three-dimensional image that serves as a current rendering target are stored.

4. The antialiasing image generation apparatus according to claim 1,
wherein said acquiring acquires the average value from a Z buffer in which the Z values in the three-dimensional image that serves as a past rendering target are stored.

5. An antialiasing image generation apparatus for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane, the antialiasing image generation apparatus comprising:
a processor; and
a non-transitory memory having stored thereon executable instructions, which when executed, cause said processor to perform:
acquiring distribution information that indicates a distribution of a plurality of Z values in the three-dimensional image;
reading polygon data indicating the polygon from a memory and expanding the read polygon data into display coordinates;
generating, for each of a plurality of pixels in a region where the polygon has been rendered, pixel data that includes a Z value at a representative point of the pixel from the polygon data expanded in said expanding;
selecting, for each of the pixels, an antialiasing technique applied to the pixel from among a plurality of antialiasing techniques, using the Z value included in the pixel data generated corresponding to the pixel in said generating and the distribution information acquired in said acquiring;
generating the graphics image by, for each of the pixels, performing the antialiasing processing on the pixel according to the antialiasing technique selected corresponding to the pixel in said selecting; and
determining a reference deviation value that serves as a reference for selecting the antialiasing technique from among the plurality of antialiasing techniques,
wherein said acquiring acquires an average value and a standard deviation of the Z values as the distribution information, and
said selecting includes, for each of the pixels, (i) calculating a deviation value of the Z value included in the pixel data generated corresponding to the pixel in said generating, using the average value and the standard deviation acquired in said acquiring and (ii) selecting the antialiasing technique applied to the pixel, using the deviation value calculated corresponding to the pixel and the reference deviation value determined in said determining.

6. The antialiasing image generation apparatus according to claim 5,
wherein said determining determines the reference deviation value by determining a ratio at which each of the antialiasing techniques is selected, from an assumed number of processing steps and the number of processing steps executed and comparing the determined ratio with a cumulative percentage of a normal distribution curve, the assumed number of processing steps being the number of processing steps assumed to be executed per pixel as an objective, and the number of processing steps executed being the number of processing steps executed per pixel according to each of the antialiasing techniques.

7. The antialiasing image generation apparatus according to claim 6,
wherein when executed, the executable instructions cause said processor to perform measuring the number of processing steps executed, and
wherein said determining determines the reference deviation value by determining the ratio from the assumed number of processing steps and the number of processing steps executed that is measured in said measuring when the three-dimensional image that serves as a past rendering target is rendered.

8. The antialiasing image generation apparatus according to claim 5,
wherein said selecting includes (i) when the calculated deviation value is the same as the reference deviation value or smaller than the reference deviation value, selecting a first antialiasing technique and (ii) when the calculated deviation value is greater than the reference deviation value, selecting a second antialiasing technique that requires a smaller number of calculations per pixel than the first antialiasing technique.

9. The antialiasing image generation apparatus according to claim 1,
wherein said selecting (i) selects a supersampling method as the first antialiasing technique and (ii) selects a multisampling method as the second antialiasing technique.

10. An antialiasing image generation method for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane, the antialiasing image generation method comprising:
acquiring an average value of a plurality of Z values in the three-dimensional image;
reading polygon data indicating the polygon from a memory and expanding the read polygon data into display coordinates;
generating, for each of pixels in a region where the polygon has been rendered, pixel data that includes a Z value at a representative point of the pixel from the polygon data expanded in said expanding;
using a processor to perform selecting, for each of the pixels, an antialiasing technique applied to the pixel from among a plurality of antialiasing techniques, using the Z value included in the pixel data generated corresponding to the pixel in said generating and the average value acquired in said acquiring; and
generating, for each of the pixels, the graphics image by performing the antialiasing processing on the pixel according to the antialiasing technique selected corresponding to the pixel in said selecting,
wherein said selecting includes (i) determining a threshold value using the average value acquired in said acquiring, (ii) when the Z value included in the pixel data is the same as the threshold value or smaller than the threshold value, selecting a first antialiasing technique, and (iii) when the Z value included in the pixel data is greater than the threshold value, selecting a second antialiasing technique that requires a smaller number of calculations per pixel than the first antialiasing technique.

11. An integrated circuit for performing antialiasing processing and generating a graphics image on which the antialiasing processing has been performed, the antialiasing processing being performed for smoothly displaying a polygon that is in three-dimensional space having a depth represented by a Z value when a three-dimensional image constituted by the polygon is rendered in a two-dimensional plane, the integrated circuit comprising:
a processor; and
a non-transitory memory having stored thereon executable instructions, which when executed, cause said processor to perform:
acquiring an average value of a plurality of Z values in the three-dimensional image;
reading polygon data indicating the polygon from a memory and expanding the read polygon data into display coordinates;
generating, for each of pixels in a region where the polygon has been rendered, pixel data that includes a Z value at a representative point of the pixel from the polygon data expanded in said expanding;
selecting, for each of the pixels, an antialiasing technique applied to the pixel from among a plurality of antialiasing techniques, using the Z value included in the pixel data generated corresponding to the pixel in said generating and the average value acquired in said acquiring; and
generating the graphics image by, for each of the pixels, performing the antialiasing processing on the pixel according to the antialiasing technique selected corresponding to the pixel in said selecting,
wherein said selecting includes (i) determining a threshold value using the average value acquired in said acquiring, (ii) when the Z value included in the pixel data is the same as the threshold value or smaller than the threshold value, selecting a first antialiasing technique, and (iii) when the Z value included in the pixel data is greater than the threshold value, selecting a second antialiasing technique that requires a smaller number of calculations per pixel than the first antialiasing technique.

12. A non-transitory computer-readable recording medium that records a program for causing a computer to execute the steps included in the antialiasing image generation method according to claim 10.

* * * * *